US012620932B2

(12) United States Patent
Wu et al.

(10) Patent No.: US 12,620,932 B2
(45) Date of Patent: May 5, 2026

(54) PHOTOVOLTAICS PANEL, PHOTOVOLTAICS SYSTEM AND EVAPORATING SYSTEM FOR PHOTOVOLTAICS SYSTEM

(71) Applicant: City University of Hong Kong, Kowloon (HK)

(72) Inventors: Wei Wu, Tsim Sha Tsui (HK); Fuxiang Li, Mongkok (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 18/667,109

(22) Filed: May 17, 2024

(65) Prior Publication Data

US 2024/0421763 A1     Dec. 19, 2024

Related U.S. Application Data

(60) Provisional application No. 63/508,481, filed on Jun. 15, 2023.

(51) Int. Cl.
*H02S 40/42* (2014.01)
*F28D 15/02* (2006.01)
*F28D 21/00* (2006.01)

(52) U.S. Cl.
CPC ........ *H02S 40/425* (2014.12); *F28D 15/0275* (2013.01); *F28D 2021/0029* (2013.01)

(58) Field of Classification Search
CPC .............. H02S 40/425; F28D 15/0275; F28D 2021/0029; Y02E 10/50
See application file for complete search history.

(56) References Cited

U.S. PATENT DOCUMENTS

2010/0186820 A1* 7/2010 Schon ..................... H02S 40/44
                                                             60/641.15
2012/0111394 A1* 5/2012 Ohmi ..................... H10F 10/17
                                                             136/252

OTHER PUBLICATIONS

Haegel NM, Atwater H, Barnes T, Breyer C, Burrell A, Chiang Y-M, et al. Terawatt-scale photovoltaics: Transform global energy. Science (80- ) 2019;364:836-8. https://doi.org/10.1126/science.aaw1845.
Victoria M, Haegel N, Peters IM, Sinton R, Jäger-Waldau A, del Cañizo C, et al. Solar photovoltaics is ready to power a sustainable future. Joule 2021;5:1041-56. https://doi.org/10.1016/J.JOULE.2021.03.005.
Green MA. How Did Solar Cells Get So Cheap? Joule 2019;3:631-3. https://doi.org/10.1016/j.joule.2019.02.010.

(Continued)

*Primary Examiner* — Michael Y Sun
(74) *Attorney, Agent, or Firm* — Renner, Kenner, Greive, Bobak, Taylor

(57)     ABSTRACT

A photovoltaics (PV) panel includes a PV module (102, 202) with a front face (102a, 202a) for exposure to sunlight and absorbing solar energy for conversion to electric energy and a back face opposite to the front face, and an evaporator (104, 204, 312) engaged with the back face of the PV module, an upper end (106, 206) of the evaporator being in close proximity to or in contact with a water source for absorbing the water by capillary action, the evaporator being of a structure allowing the water to move through, and the PV module being in a heat-transferrable relationship with the water moving through the evaporator.

21 Claims, 40 Drawing Sheets
(7 of 40 Drawing Sheet(s) Filed in Color)

(56)            References Cited

OTHER PUBLICATIONS

Jäger-Waldau A. PV Status Report 2019. 2019. https://doi.org/10. 2760/326629.

Wang W, Aleid S, Shi Y, Zhang C, Li R, Wu M, et al. Integrated solar-driven PV cooling and seawater desalination with zero liquid discharge. Joule 2021;5:1873-87. https://doi.org/10.1016/J.JOULE. 2021.05.010.

Polman A, Knight M, Garnett EC, Ehrler B, Sinke WC. Photovoltaic materials: Present efficiencies and future challenges. Science (80- ) 2016;352. https://doi.org/10.1126/science.aad4424.

Li F, Wu W. Coupled electrical-thermal performance estimation of photovoltaic devices: A transient multiphysics framework with robust parameter extraction and 3-D thermal analysis. Appl Energy 2022;319:119249. https://doi.org/10.1016/J.APENERGY.2022. 119249.

Waqar Akram M, Li G, Jin Y, Chen X. Failures of Photovoltaic modules and their Detection: A Review. Appl Energy 2022;313:118822. https://doi.org/10.1016/j.apenergy.2022.118822.

Siddiqui MU, Arif AFM. Electrical, thermal and structural performance of a cooled PV module: Transient analysis using a multiphysics model. Appl Energy 2013; 112:300-12. https://doi.org/10.1016/j.apenergy.2013.06.030.

Kumar M, Kumar A. Performance assessment and degradation analysis of solar photovoltaic technologies: A review. Renew Sustain Energy Rev 2017;78:554-87. https://doi.org/10.1016/j.rser.2017. 04.083.

Hernandez-Perez JG, Carrillo JG, Bassam A, Flota-Banuelos M, Patino-Lopez LD. A new passive PV heatsink design to reduce efficiency losses: A computational and experimental evaluation. Renew Energy 2020; 147: 1209-20. https:// doi.org/10.1016/j.renene. 2019.09.088.

Bohlen O, Kowal J, Sauer DU. Ageing behaviour of electrochemical double layer capacitors. Part I. Experimental study and ageing model. J Power Sources 2007; 172:468-75. https://doi.org/10.1016/j.jpowsour.2007.07.021.

Xu L, Liu W, Liu H, Ke C, Wang M, Zhang C, et al. Heat generation and mitigation in silicon solar cells and modules. Joule 2021;5:631-45. https://doi.org/10.1016/j.joule.2021.01.012.

Siecker J, Kusakana K, Numbi BP. A review of solar photovoltaic systems cooling technologies. Renew Sustain Energy Rev 2017;79:192-203. https://doi.org/10.1016/j.rser.2017.05.053.

Gharzi M, Arabhosseini A, Gholami Z, Rahmati MH. Progressive cooling technologies of photovoltaic and concentrated photovoltaic modules: A review of fundamentals, thermal aspects, nanotechnology utilization and enhancing performance. Sol Energy 2020;211:117-46. https://doi.org/10.1016/j.solener.2020.09.048.

Sato D, Yamada N. Review of photovoltaic module cooling methods and performance evaluation of the radiative cooling method. Renew Sustain Energy Rev 2019; 104:151-66. https://doi.org/10.1016/j.rser.2018.12.051.

Zou Z, Yan W, Gong H, Wang Y, Shao J. Quantifying the performance advantage of the novel passive air cooling system for PV array and system structure optimization. Appl Therm Eng 2019; 149:899-908. https://doi.org/10.1016/j. applthermaleng.2018.12. 085.

Bayrak F, Oztop HF, Selimefendigil F. Experimental study for the application of different cooling techniques in photovoltaic (PV) panels. Energy Convers Manag 2020;212:112789. https://doi.org/10.1016/j.enconman.2020.112789.

Bevilacqua P, Bruno R, Rollo A, Ferraro V. A novel thermal model for PV panels with back surface spray cooling. Energy 2022;255:124401. https://doi.org/10.1016/j. energy.2022. 124401.

Krauter S. Increased electrical yield via water flow over the front of photovoltaic panels. Sol Energy Mater Sol Cells 2004;82:131-7. https://doi.org/10.1016/j.solmat.2004.01.011.

Kjeldstad T, Lindholm D, Marstein E, Selj J. Cooling of floating photovoltaics and the importance of water temperature. Sol Energy 2021;218:544-51. https://doi.org/10.1016/j.solener.2021.03.022.

Elminshawy NAS, El-Damhogi DG, Ibrahim IA, Elminshawy A, Osama A. Assessment of floating photovoltaic productivity with fins-assisted passive cooling. Appl Energy 2022;325:119810. https://doi.org/10.1016/j. apenergy.2022.119810.

Hernandez-Perez JG, Carrillo JG, Bassam A, Flota-Banuelos M, Patino-Lopez LD. Thermal performance of a discontinuous finned heatsink profile for PV passive cooling. Appl Therm Eng 2021; 184: 116238. https://doi.org/10.1016/J.APPLTHERMALENG.2020. 116238.

Zhou Z, Tkachenko S, Bahl P, Tavener D, de Silva C, Timchenko V, et al. Passive PV module cooling under free convection through vortex generators. Renew Energy 2022; 190:319-29. https://doi.org/10.1016/j.renene.2022.03.133.

Zhao D, Aili A, Zhai Y, Xu S, Tan G, Yin X, et al. Radiative sky cooling: Fundamental principles, materials, and applications. Appl Phys Rev 2019;6. https://doi.org/10.1063/1.5087281.

Ahmed S, Li S, Li Z, Xiao G, Ma T. Enhanced radiative cooling of solar cells by integration with heat pipe. Appl Energy 2022;308:118363. https://doi.org/10.1016/J.APENERGY.2021.118363.

Zhao B, Lu K, Hu M, Liu J, Wu L, Xu C, et al. Radiative cooling of solar cells with micro-grating photonic cooler. Renew Energy 2022; 191:662-8. https://doi.org/10.1016/j.renene.2022.04.063.

Park J, Kim T, Leigh SB. Application of a phase-change material to improve the electrical performance of vertical-building-added photovoltaics considering the annual weather conditions. Sol Energy 2014; 105:561-74. https://doi.org/10.1016/j.solener.2014.04.020.

Hasan A, McCormack SJ, Huang MJ, Sarwar J, Norton B. Increased photovoltaic performance through temperature regulation by phase change materials: Materials comparison in different climates. Sol Energy 2015;115:264-76. https://doi.org/10.1016/j.solener.2015.02. 003.

Ma T, Li Z, Zhao J. Photovoltaic panel integrated with phase change materials (PV-PCM): technology overview and materials selection. Renew Sustain Energy Rev 2019; 116:109406. https://doi.org/10. 1016/j.rser.2019.109406.

Malvika A, Arunachala UC, Varun K. Sustainable passive cooling strategy for photovoltaic module using burlap fabric- gravity assisted flow: A comparative Energy, exergy, economic, and enviroeconomic analysis. Appl Energy 2022;326:120036. https://doi.org/10.1016/j.apenergy.2022.120036.

Dida M, Boughali S, Bechki D, Bouguettaia H. Experimental investigation of a passive cooling system for photovoltaic modules efficiency improvement in hot and arid regions. Energy Convers Manag 2021;243:114328. https://doi.org/10.1016/j.enconman.2021. 114328.

Huang G, Xu J, Markides CN. High-efficiency bio-inspired hybrid multi-generation photovoltaic leaf. Nat Commun 2023;14. https://doi.org/10.1038/s41467-023-38984-7.

Li Z, Ma T, Ji F, Shan H, Dai Y, Wang R. A Hygroscopic Composite Backplate Enabling Passive Cooling of Photovoltaic Panels. ACS Energy Lett 2023;8:1921-8. https://doi.org/10.1021/acsenergylett. 3c00196.

Gkaniatsou E, Meng B, Cui F, Loonen R, Nouar F, Serre C, et al. Moisture-participating MOF thermal battery for heat reallocation between indoor environment and building-integrated photovoltaics. Nano Energy 2021;87. https://doi.org/10.1016/j.nanoen.2021. 106224.

Li R, Shi Y, Wu M, Hong S, Wang P. Photovoltaic panel cooling by atmospheric water sorption-evaporation cycle. Nat Sustain 2020;3:636-43. https://doi.org/10.1038/s41893-020-0535-4.

Ni F, Xiao P, Zhang C, Chen T. Hygroscopic polymer gels toward atmospheric moisture exploitations for energy management and freshwater generation. Matter 2022;5:2624-58. https://doi.org/10. 1016/j.matt.2022.06.010.

Li R, Wang W, Shi Y, Wang AC, Wang P. Advanced Material Design and Engineering for Water-Based Evaporative Cooling. Adv Mater 2023;2209460:2209460. https://doi.org/10.1002/adma.202209460.

Liu J, Zhou Y, Zhou Z, Du Y, Wang C, Yang X, et al. Passive Photovoltaic Cooling 1: Advances Toward Low-Temperature Operation 2023;2302662:1-23. https://doi.org/10.1002/aenm.202302662.

Jing J, Zhou Y, Wang L, Liu Y, Wang D. The spatial distribution of China's solar energy resources and the optimum tilt angle and

(56)                    References Cited

OTHER PUBLICATIONS power generation potential of PV systems. Energy Convers Manag
2023;283:116912. https://doi.org/10.1016/J.ENCONMAN.2023.
116912.

* cited by examiner

100

102

302
304a
306
304b
308
310
312

300

PHOTOVOLTAICS PANEL, PHOTOVOLTAICS SYSTEM AND EVAPORATING SYSTEM FOR PHOTOVOLTAICS SYSTEM

This application claims priority from U.S. Patent Application No. 63/508,481 filed on 15 Jun. 2023, the content of which being incorporated herein by reference in its entirety as if fully set forth herein.

FIELD OF THE INVENTION

This invention relates to a photovoltaics (PV) panel, a PV system with such a PV panel, and an evaporating system for a PV system.

BACKGROUND OF THE INVENTION

Solar energy is essential for achieving global energy sustainability, given its vast abundance and free availability. Photovoltaics (PV) can convert irradiance into usable electricity with zero carbon emission and thus holds great promise to harness solar energy. In recent decades, efficiency improvement and cost decline have enabled the commercialization of crystalline silicon (c-Si) PV technology. The cumulative capacity of PV installation is projected to increase from 700 GW in 2020 to 22 TW by the end of 2050.

Despite the promising prospect, c-Si PV can only utilize a limited fraction (<25.6%) of the incident solar spectrum, with the rest wasted as heat. The resulting high temperature shortens the lifetime and decreases the power conversion efficiency of such panels, and may even cause fire hazards. The efficiency of typical c-Si panels decreases by about 5.0% and their aging rate doubles with every 10° C. increase in operating temperature. As the c-Si technology approaches the theoretical limit while the next-generation technologies (e.g., perovskite) are far from mature commercialization, improving the light-to-electricity efficiency via material progress becomes increasingly difficult. It is time to regulate PV temperature with thermal management technologies, thus enhancing efficiency and reliability. Ideal PV thermal management can reliably create the maximal cooling effect with the least cost. Existing PV thermal management technologies are classified into active (mechanically driven) and passive (naturally driven), depending on the energy requirement.

Active technologies typically include forced circulation of fluids (e.g., air or water), requiring fan and pump powers. For example, forced ventilation on a hot PV surface or a backside heat sink can reject heat by airflow. However, this scheme was not widespread due to low cooling efficiency, high fan power, and additional air duct structures. Comparatively, water has a larger heat capacity and thermal conductivity and can absorb much heat during evaporation. These features enable advanced water spray, water veils, and backside direct-contact water to achieve high heat-removal efficiency. However, these processes can consume large amounts of water due to the fluidity of water and inefficient heat transfer design. The overall cost-effectiveness remains low with complex system configuration and massive pump power.

On the other hand, passive technologies that rely on spontaneous processes provide attractive solutions to this problem. The finned structure is a typical example of enhancing heat convection at the cost of system compactness, and its heat removal efficiency depends on wind velocity. Radiative cooling (RC) is another method for PV cooling by rejecting the waste heat directly to the universe through the atmosphere transparency window from 8 to 13 μm. However, commercial PV glass is already a high-emissivity surface that limits the cooling efficiency of RC. A recent outdoor experiment indicated that RC only contributes to a temperature reduction of 3.6° C. in existing mainstream c-Si cells. In addition, phase change material (PCM) that can maintain a stable temperature during phase transition can be attached to the PV back for heat extraction. Although a well-developed PV-PCM system can achieve a temperature reduction of 7-21° C., low thermal conductivity, incongruent melting, and cyclic degradation are long-standing problems. Recently, passive evaporative cooling using a backside evaporator under the PV has received significant research interest. For example, a burlap-based evaporative cooler with a gravity-assisted water supply can enable a temperature drop of 15-20° C. A more recent biomimetic cooler was proposed based on bamboo bundles and packed hydrogels. In the lab-scale proof-of-concept prototype, the water for evaporation is supplied into the evaporator via capillarity and transpiration effects, with a temperature reduction of about 26° C. Hygroscopic sorbents (e.g., hygroscopic hydrogels and metal-organic frameworks) are another passive scheme option. Without using an additional water supply, this technology provides evaporative cooling by a sorption-evaporation cycle that removes waste heat via evaporation under the sun and recovers the moisture at night. These reported pilot cooling prototypes exhibited impressive temperature reduction (6-15° C.) when using fully charged sorbent layers. However, such systems are susceptible to dehydrate in the actual environment due to the slow sorption kinetics and cyclic degradation.

In summary, active thermal management has a high cooling efficiency but will introduce complex system design and additional operating costs due to parasitic power and water consumption. While various passive cooling approaches exist, they are limited by either low cooling power or reliability issues. Therefore, existing cooling technologies leave vast potential for improving cooling performance, optimizing operation strategy, reducing energy/water consumption, and robust climate adaptation untapped.

It is thus an objective of the present invention to provide a photovoltaics (PV) panel, a PV system and an evaporating system for a PV system, in which at least one of the above shortcomings is mitigated, or at least to provide a useful alternative to the trade and public.

SUMMARY OF THE INVENTION

According to a first aspect of the present invention, there is provided a photovoltaics (PV) panel including a PV module with a front face for exposure to sunlight and absorbing solar energy for conversion to electric energy and a back face opposite to said front face, and an evaporator engaged with said back face of said PV module, wherein a first end of said evaporator is adapted to be in close proximity to or in contact with a source of a cooling medium for absorbing said cooling medium by capillary action, wherein said evaporator is of a structure allowing said cooling medium to move through, and wherein said PV module is adapted to be in a heat-transferrable relationship with said cooling medium moving through said evaporator.

In one embodiment, a second end of said evaporator is adapted to be in close proximity to or in contact with a lower container for collecting said cooling medium exiting said evaporator from said second end.

According to a second aspect of the present invention, there is provided a photovoltaics (PV) system including a PV panel, said PV panel including a PV module with a front face for exposure to sunlight and absorbing solar energy for conversion to electric energy and a back face opposite to said front face, and an evaporator engaged with said back face of said PV module; wherein a first end of said evaporator is adapted to be in close proximity to or in contact with a source of a cooling medium for absorbing said cooling medium by capillary action, wherein said evaporator is of a structure allowing said cooling medium to move through, and wherein said PV module is adapted to be in a heat-transferrable relationship with said cooling medium moving through said evaporator.

In one embodiment, a second end of said evaporator is adapted to be in close proximity to or in contact with a lower container for collecting said cooling medium exiting said evaporator from said second end.

According to a third aspect of the present invention, there is provided an evaporating system for a photovoltaics (PV) system, including an evaporator engageable with a back face of a PV module, and an upper container for a cooling medium, wherein a first end of said evaporator extends in close proximity to or at least partly into said upper container and is adapted to absorb said cooling medium in said upper container by capillary action, wherein said evaporator is of a structure allowing said cooling medium to move through, and wherein, when said evaporator is engaged with said PV panel, said PV module is adapted to be in a heat-transferrable relationship with said cooling medium moving through said evaporator.

In one embodiment, said evaporating system further includes a lower container for a cooling medium, an irradiance sensor, a liquid-level sensor, and a control system.

In one further embodiment, a second end of said evaporator is adapted to be in close proximity to or in contact with a lower container for collecting said cooling medium exiting said evaporator from said second end.

In an additional embodiment, said control system is adapted to stop operation of said pump when solar irradiance on said PV panel as measured by said irradiance sensor is below a threshold level, to activate operation of said pump for a first predetermined period of time to pump said cooling medium to said upper container when solar irradiance on said PV panel as measured by said irradiance sensor is above said threshold level, and to activate operation of said pump for a second predetermined period of time to pump said cooling medium to said upper container when solar irradiance on said PV panel as measured by said irradiance sensor is above said threshold level and said cooling medium in said upper container as sensed by said liquid-level sensor is below a pre-set level.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Embodiments of the present invention will now be described, by way of examples only, with reference to the accompanying drawings, in which:

FIG. 1c shows schematically the cooling mechanism for a PV panel with the evaporator as shown in FIG. 1a;

FIGS. 1d to 1f show different operation modes of the PV system of FIG. 1a;

DESCRIPTION OF EMBODIMENTS OF THE INVENTION

According to the present invention, there is provided a smart wicking evaporator (SWE) by co-designing capillarity, interfacial evaporation, siphon, electronic hardware, and a climate-adaptive control algorithm to offer a solution to these issues. This interdisciplinary design can dissipate the PV waste heat using interfacial evaporation with near-zero energy input and low water consumption. The capillarity-triggered siphon flow inside the evaporator sustains the interfacial evaporation passively. In addition, a compact and low-cost electronic hardware platform is embedded with a robust algorithm, achieving an automatic climate-adaptive operation.

Figure 1A:
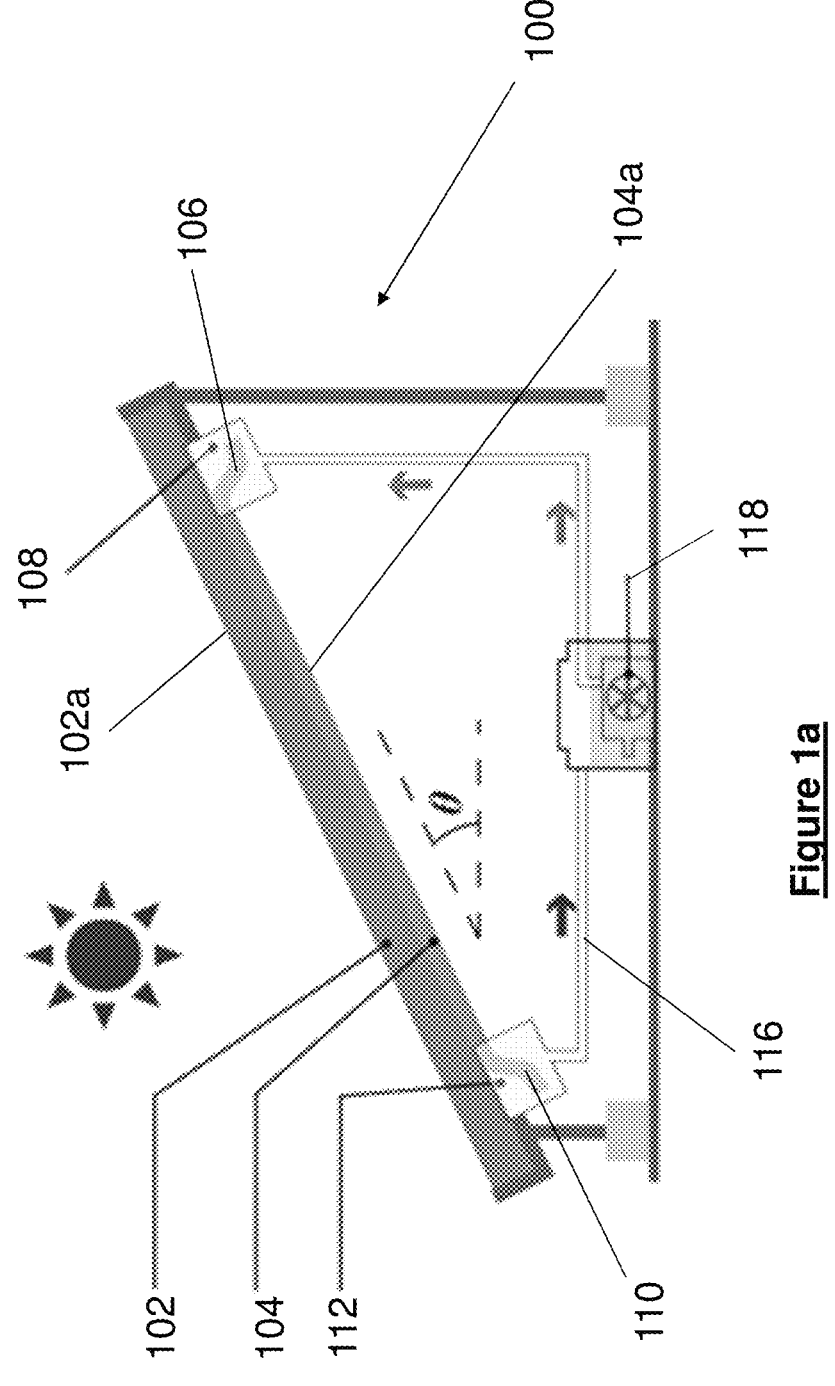
FIG. 1a shows a schematic view of a first embodiment of a photovoltaics (PV) system according to the present invention.

FIG. 1a shows the components of a photovoltaics (PV) system according to a first embodiment of the present invention (herein referred to as "PVS-I"), generally designated as 100. The PVS-I 100 consists of two parts: a PV module 102 with a thin-film hydrophilic wicking evaporator 104 and an adaptive control platform.

The PV module 102 has a front face 102a for exposure to sunlight and absorbing solar energy for conversion to electric energy and a back face opposite to the front face 102a. The evaporator 104 is engaged directly or indirectly with the back face of the PV module 102, and may be made of a water absorbent material with a porous structure, such as cotton fabric. An upper end 106 of the evaporator 104 extends into or is in close proximity to an upper tank 108 (such as being immersed in the upper tank 108). When the upper tank 108 contains water (which serves as a cooling medium) to a certain level, the upper end 106 of the evaporator 104 will contact or come into close proximity to the water in the upper tank 108, such that the capillary (wicking) effect will help the water in the tank 108 overcome gravity to permeate upwards along the upper end 106 of the evaporator 104. Once water is over the top point of the evaporator 104, gravity becomes a driving force to transport the water to a lower end 110 in a lower tank 112, which is lower than the upper end 106. Some of the water absorbed by the evaporator 104, after moving from the upper end 106 and through the body of the evaporator 104, exits the evaporator 104 from the lower end 110.

Figure 1B:
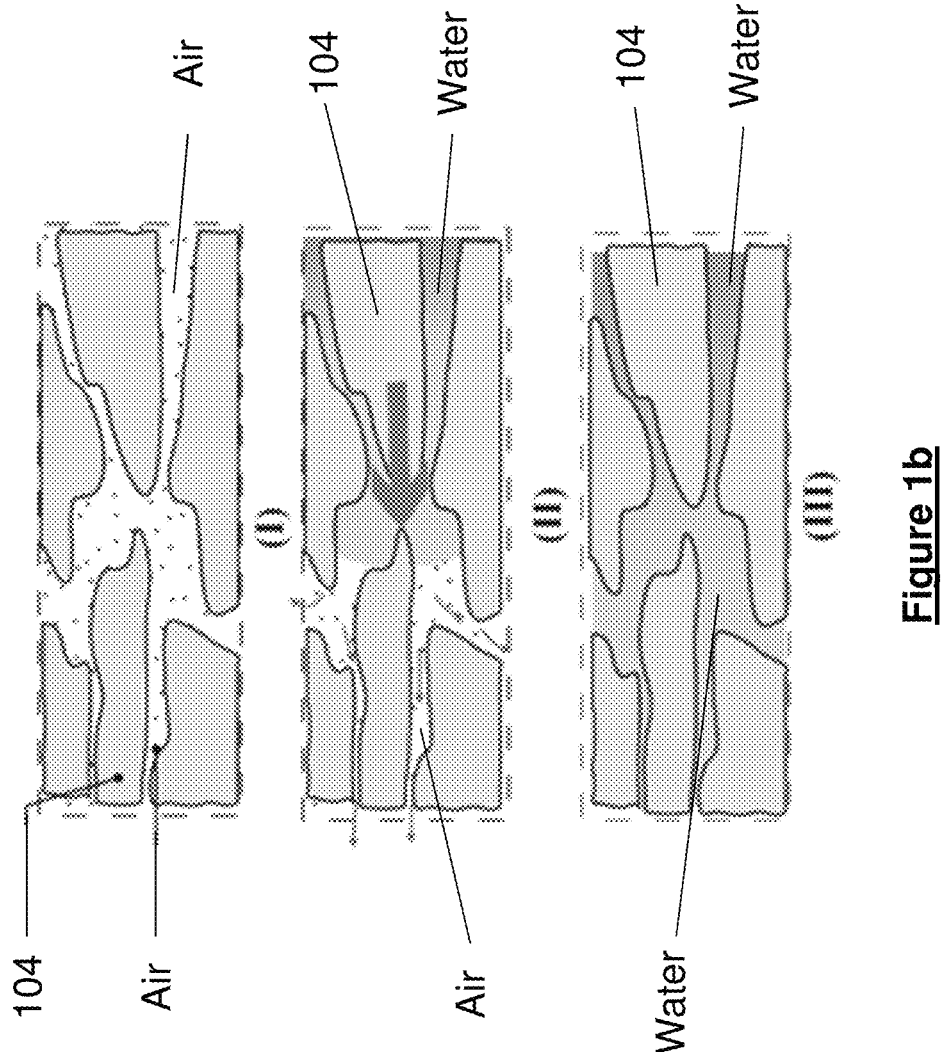
FIG. 1b shows enlarged sectional views of an evaporator used in the PV system of FIG. 1a and formation of siphoning channels.
Figure 1C:
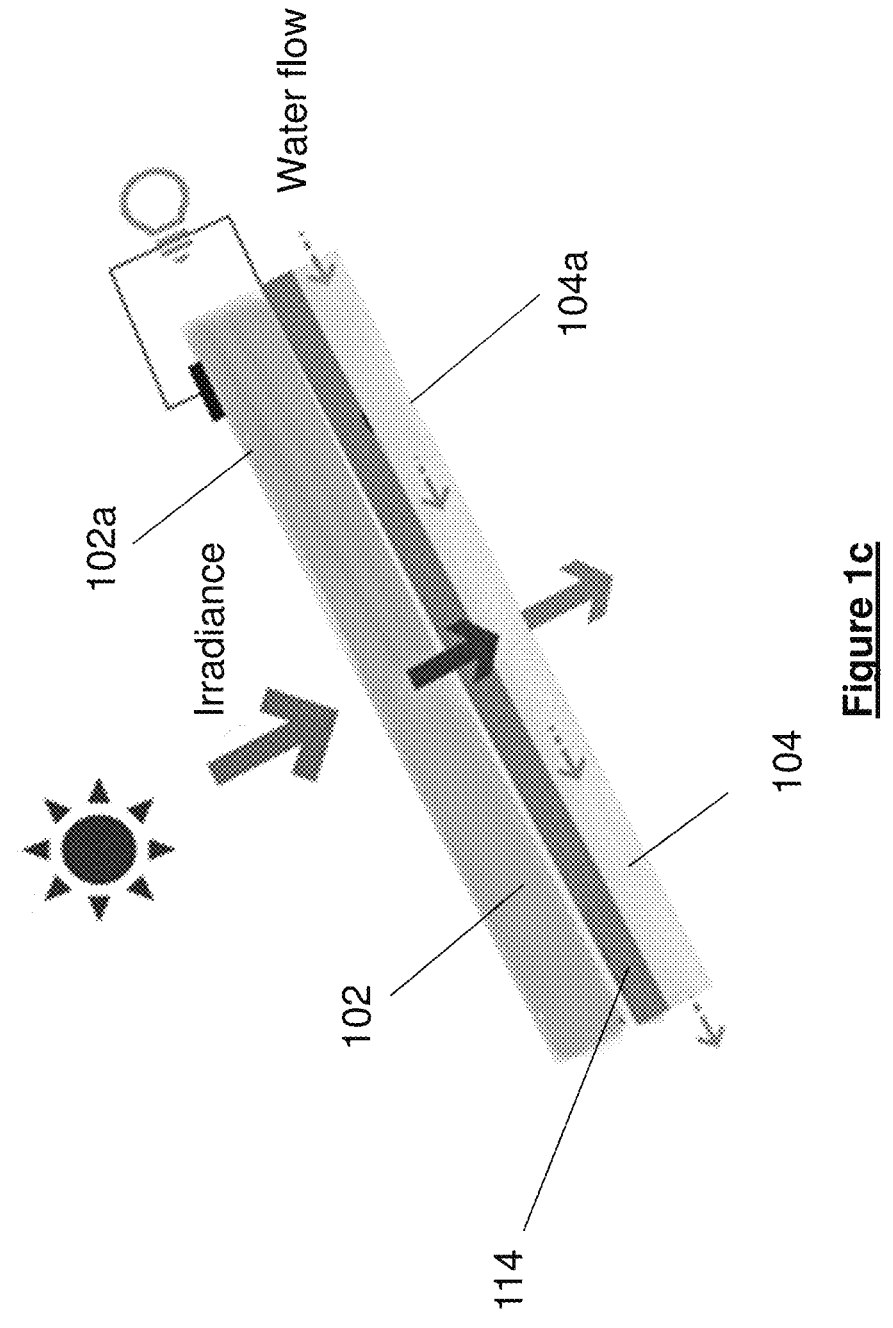

The evaporator 104 is previously dry and its porous structure is filled with air A (as shown in FIG. 1b (I)). Without being intended to be limited by the theory, it is believed that the downwardly-flowing water (the direction of flow of water being shown by the arrow in FIG. 1b (II)) gradually expels the air originally in the evaporator 104 and finally results in siphon channels (FIG. 1c). Because PV modules are always installed in a certain tilt angle θ relative to the horizontal, the thin water film confined inside the evaporator 104 creeps down through the evaporator 104 under gravity.

Under the sunlight, the waste heat in the PV module 102 is conducted through a thermal interface layer (TIM) 114 to the evaporator 104, resulting in localized water heating and vapor release (FIG. 1c). The thermal interface layer 114 may be made of a thermally-conductive double-sided adhesive tape, such as 467MP thermally-conductive double-sided adhesive tape by 3M Company of USA. By way of such an arrangement, the evaporator 104 may be fixedly engaged with the PV module 102 via the thermal interface layer 114. When water absorbed by the evaporator 104 moves through the evaporator 104, it is in a heat-transferrable relationship with the thermal interface layer 114, and thus with the PV module 102. Some of the water absorbed by the upper end 106 and moving through the evaporator 104, upon absorbing the heat from the PV module 102, will evaporate to the environment from the evaporator 104 from and through a face 104a of the evaporator 104 facing away from the front face 102a of the PV module 102, thus helping to cool down the PV module 102.

The unevaporated water, after exiting the evaporator 104 through the lower end 110 of the evaporator 104, is collected by the lower tank 112 and returned to a liquid pump 118 (such as a water pump) via a soft pipe 116, to be subsequently pumped by the liquid pump 118 back to the upper tank 108. Since the thin-film evaporator 104 and the tanks 108, 112 are hidden under the PV module 102, this compact system can offer cooling without interfacing with the incident irradiance. Compared with traditional water-based cooling methods (e.g., sprinkle, channel, spray, water veil, etc.), the passive siphon effect and high heat-to-vapor conversion enable this process to at least reduce pump power and undesired water waste, achieving a similar water-saving result as in drip irrigation used in agriculture. As the unevaporated water, in the course of its movement through the evaporator 104, gets heated up by the waste heat generated by the PV module 102, the unevaporated water also assists in dissipating heat away from (and thus cooling down) the PV module 102 even though such water is not evaporated to the environment.

Figure 1D:
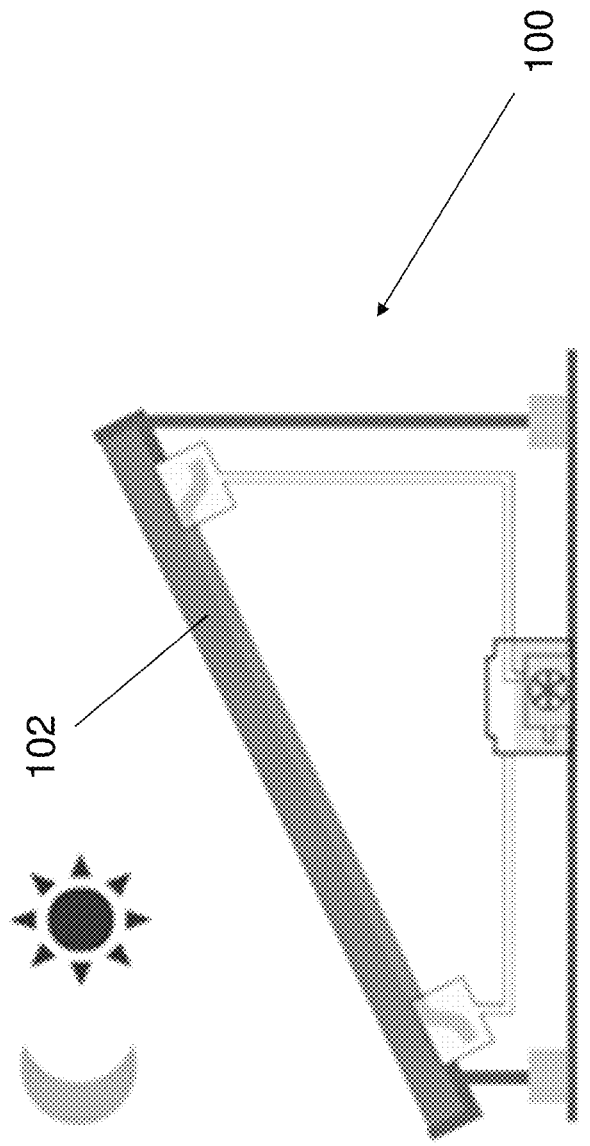
Figure 1E:
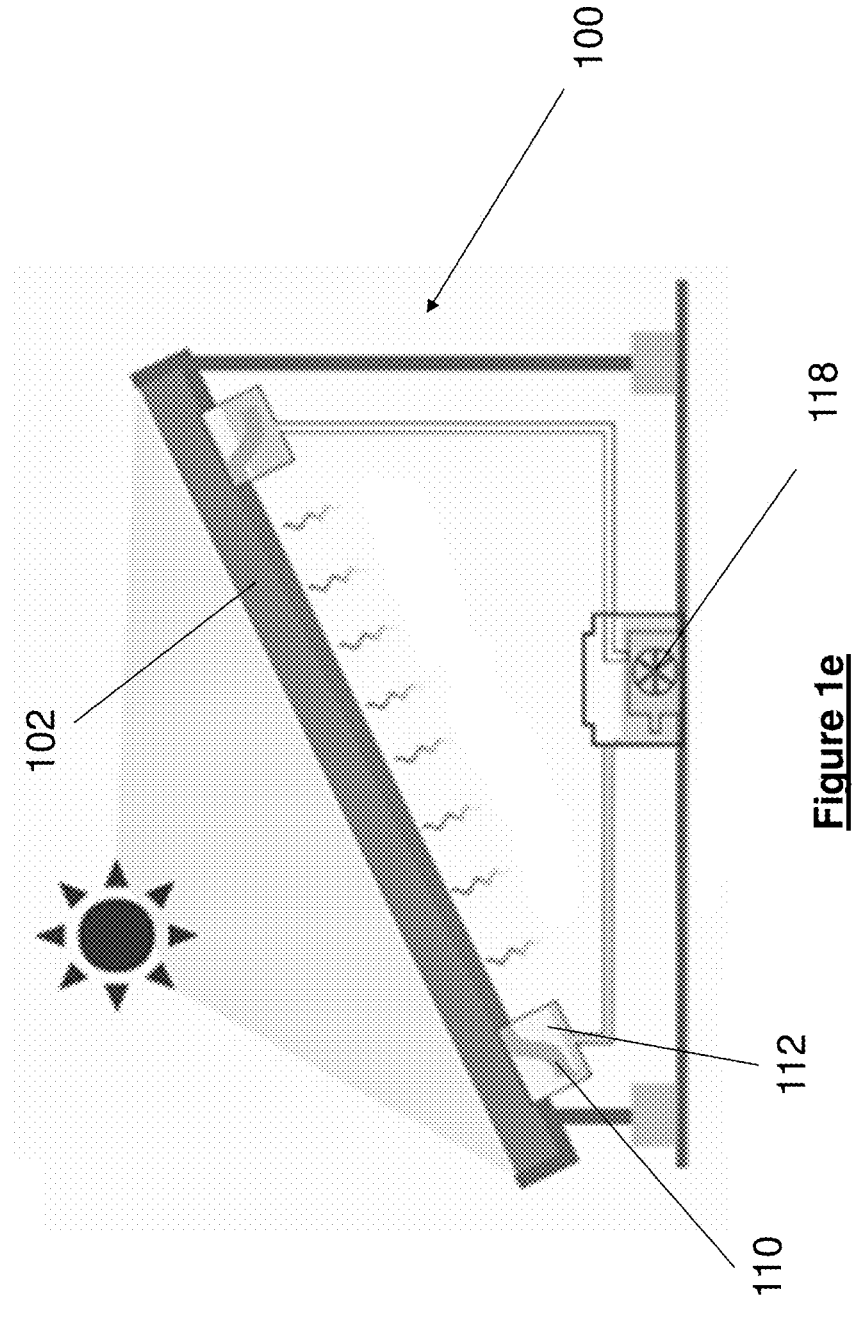
Figure 1F:
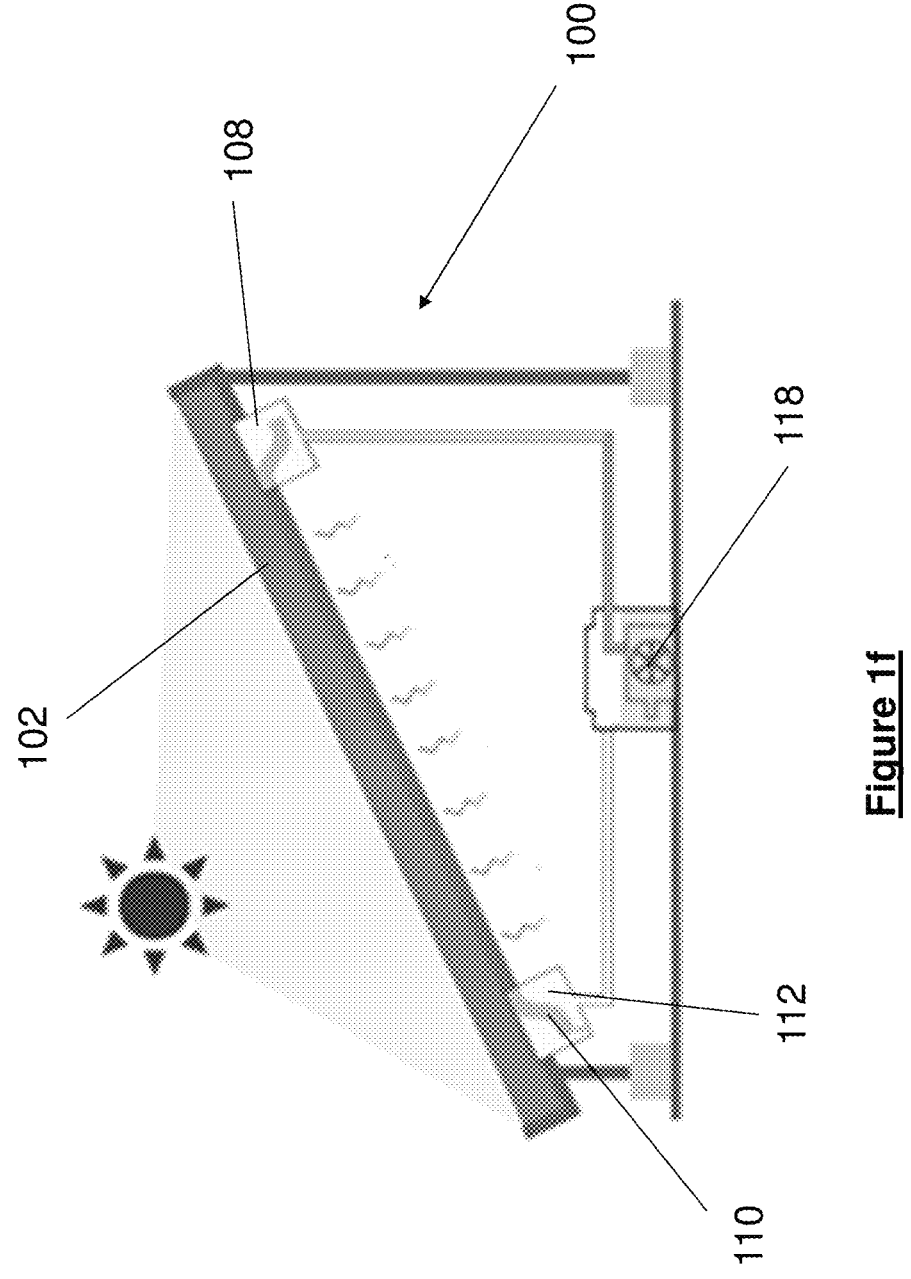

Keeping the passive process is vital for removal of heat from the PV module 102, so that the evaporator 104 can continuously cool down the PV module 102, thereby ensuring improved power. In addition, the thermal management demands vary as weather changes, so a climate-adaptive operation is needed. A smart control system with three operation modes (namely, Mode 1, Mode 2, Mode 3) is provided to meet these needs simultaneously. In Mode 1 (as shown in FIG. 1*d*), when the PVS-I 100 operates in low/no irradiance periods (e.g., when the solar irradiance on the PV module 102 as measured by an irradiance sensor is below a first threshold level), the PV module 102 generates very low electricity, and there is no/little thermal management demand. The PVS-I 100 is thus on standby for energy saving. Once the weather is irradiance-intensive (e.g., when the solar irradiance on the PV module 102 as measured by the irradiance sensor is above a threshold level, which may or may not be the same as the first threshold level mentioned above), the PVS-I 100 enters Mode 2 (as shown in FIG. 1*e*) and triggers the mentioned process by operating a pump 118 for a first predetermined period of time to pump water into the upper tank 108. During this irradiance-intensive period, the PVS-I 100 contributes to most of the daily electricity generation, and cooling can boost it significantly. When the solar irradiance on the PV module 102 as measured by the irradiance sensor is still above the threshold level and there is not enough water in the upper tank 108 (e.g., when the water level in the upper tank 108 as sensed by a liquid-level sensor (such as a water-level sensor) falls below a pre-set level) the PVS-I 100 enters Mode 3 (as shown in FIG. 1*f*), in which the pump 118 operates for a second predetermined period of time (which may or may not be the same as the first predetermined period of time) to pump water to the upper tank 108. The lower tank 112 is under and is in close proximity to or in contact with the lower end 110 of the evaporator 104 for receiving water exiting the lower end 110, for further water savings. This enables the developed passive method to exhibit high climate adaptivity and reliability, thus outperforming the existing passive technologies.

Figure 1G:
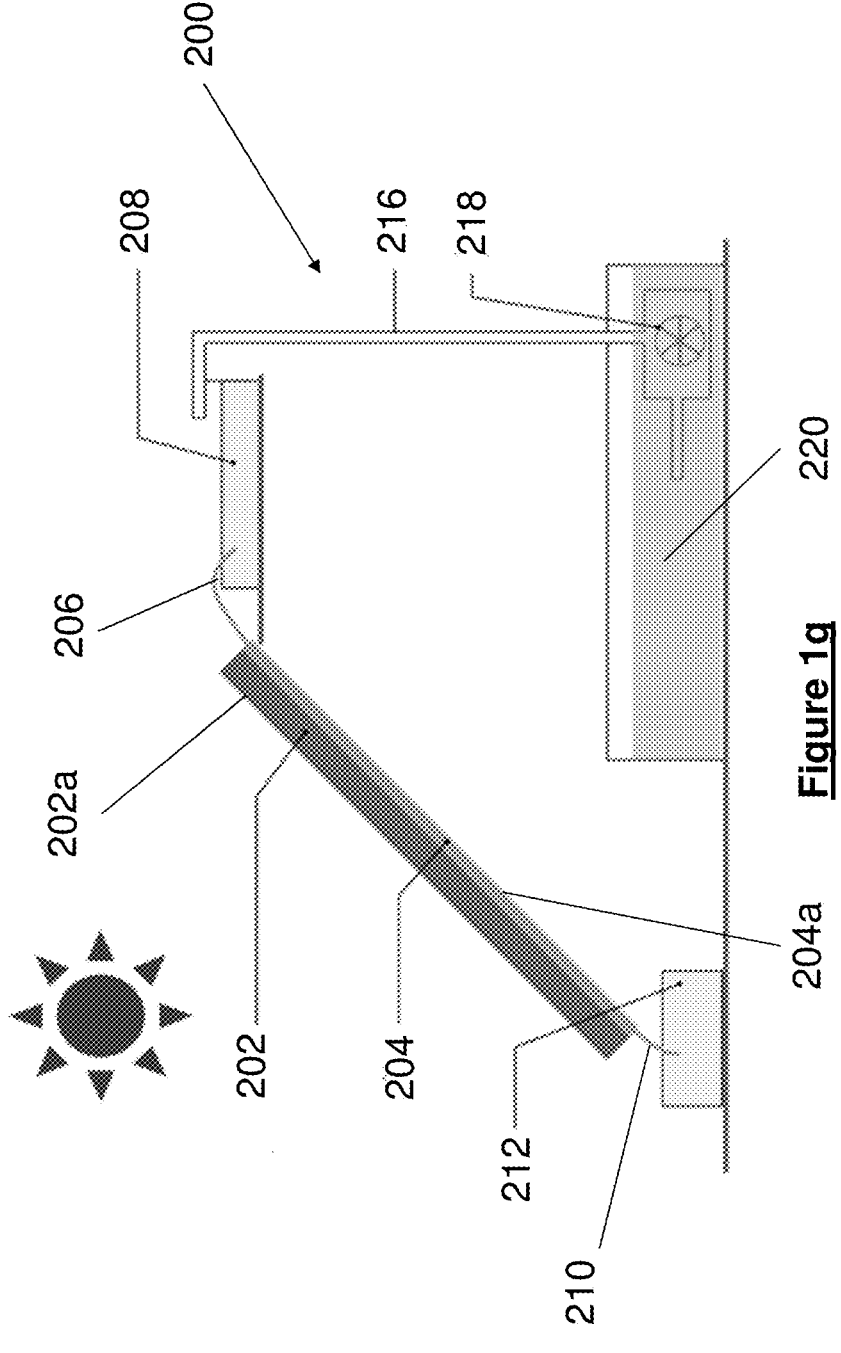
FIG. 1g shows a schematic drawing of a second embodiment of a photovoltaics (PV) system according to the present invention.

A photovoltaics (PV) system according to a second embodiment of the present invention (herein referred to as "PVS-I") is shown in FIG. 1*g*, generally designated as 200. Similar to the PVS-I 100 discussed above, the PVS-I 200 also includes a PV module 202 with a front face 202*a* for exposure to sunlight and absorbing solar energy for conversion to electric energy and a back face opposite to the front face 202*a*, and an evaporator 204 (which may be made of a water absorbent material with a porous structure, such as cotton fabric) engaged directly or indirectly (such as via a thermal interface layer, e.g., 467MP thermally-conductive double-sided adhesive tape by 3M Company) with the back face of the PV module 202.

An upper end 206 of the evaporator 204 extends into or is in close proximity to an upper tank 208, so as to come into contact with or be in close proximity to a cooling medium (e.g., water) contained in an upper tank 208, to absorb the cooling medium in the upper tank 208 by capillary (wicking) action. The cooling medium then moves through the porous structure of the evaporator 204, and gets heated up by the waste heat generated by the PV module 202. The cooling medium (e.g., water) moving through the evaporator 204 is in a heat-transferrable relationship with the PV module 202, and absorbs waste heat generated by the PV module 202. Thus heated, some of such cooling medium evaporates from and through a face 204*a* of the evaporator 204 facing away from the front face 202*a* of the PV module 202, thus assisting in cooling down the PV module 202.

The unevaporated cooling medium, after moving through the evaporator 204, exits the evaporator 204 through a lower end 210 of the evaporator 204 (which is below the upper end

206 of the evaporator 204), to be collected by a lower tank 212. The cooling medium may then be poured into a pump tank 220, so that when a liquid pump 218 (e.g., a water pump) operates, the cooling medium can be pumped through a pipe 216 up to the upper tank 208, to be absorbed again by the evaporator 204.

Figure 2A:
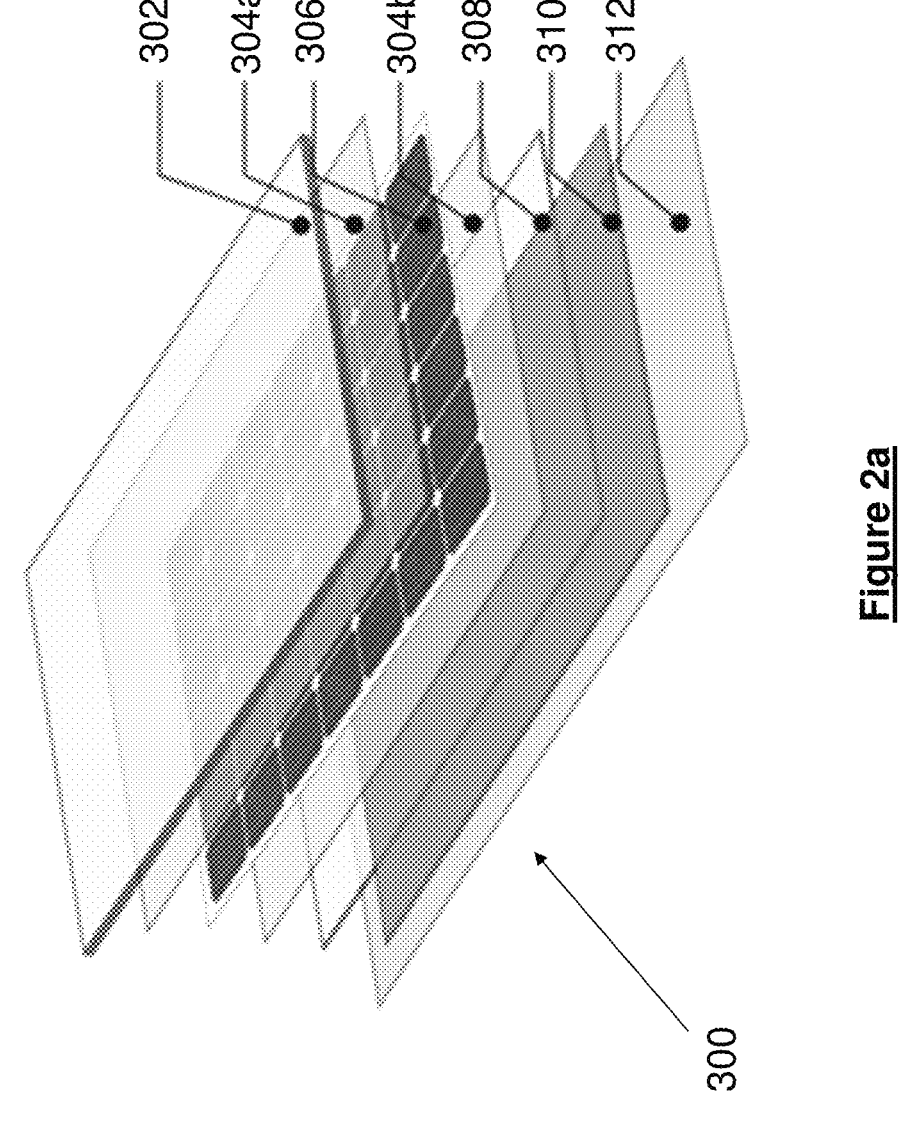
FIG. 2a shows an exploded view of a PV panel and an evaporator according to an embodiment of the present invention.

As shown in more detail in FIG. 2*a*, a PV panel 300 according to the present invention includes, from top to bottom (in the sense of FIG. 2*a*), a glass layer 302, an upper encapsulation layer 304*a*, a PV module 306, a lower encapsulation layer 304*b*, a back sheet 308, a waterproof thermal interface layer (TIM) 310, and an evaporator layer 312 made of a cooling medium absorbent material with a porous structure (also called a "wicking layer").

Figure 2B:
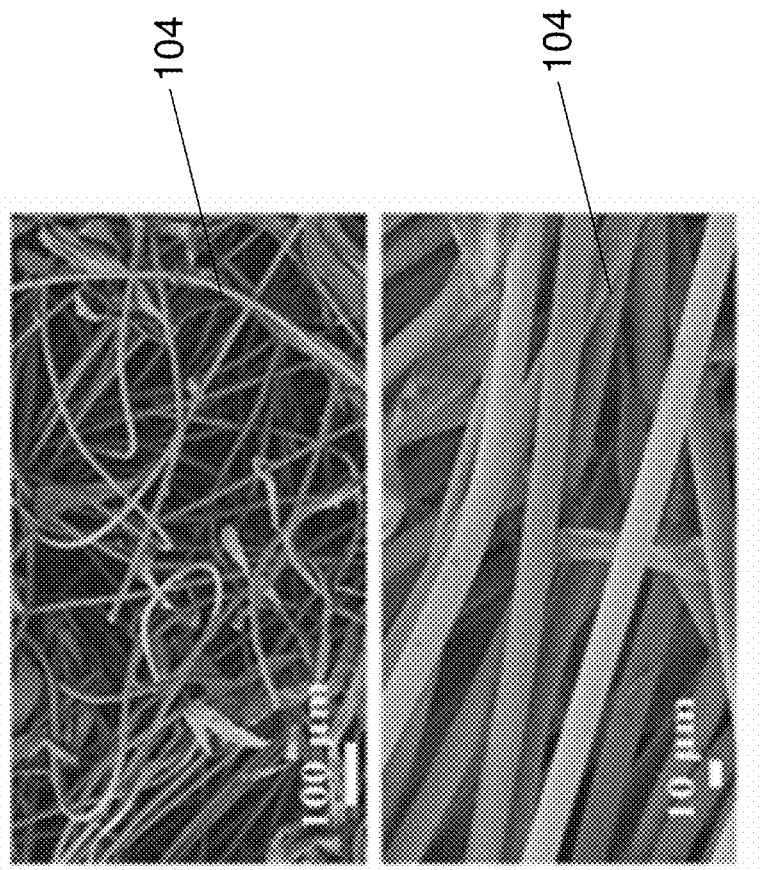
FIG. 2b shows scanning electron microscope (SEM) images of the microporous structure of the evaporator.
Figure 2C:
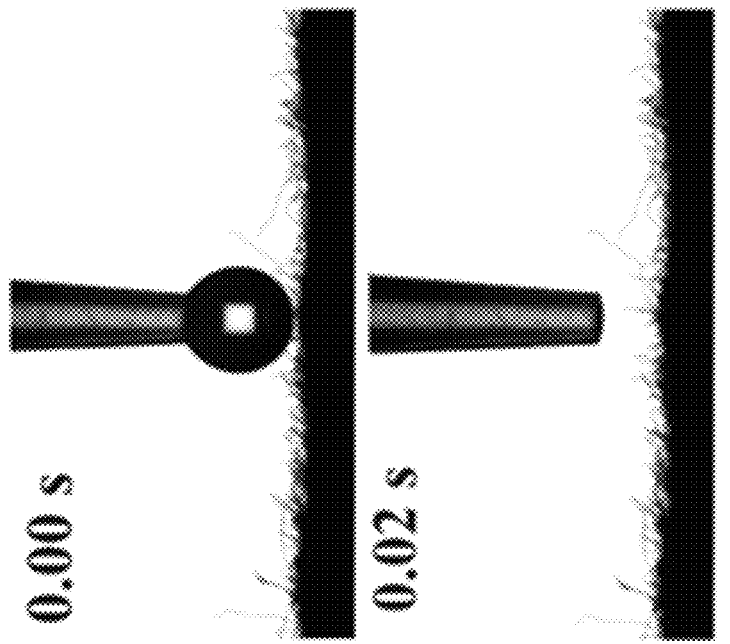
FIG. 2c shows wetting performance of the evaporator.

The evaporator layer 312 is attached to the back sheet 308 of the PV module 306. These two components are adhered with each other via the waterproof thermal interface layer (TIM) 310 (such as 467MP thermally-conductive double-sided adhesive tape by 3M Company) for heat conduction and moisture degradation. Cotton fabric with a thickness of 3 mm is adopted as the evaporator layer 312 because its rich hydrophilic porous structure (as shown in FIG. 2*b*) enables fast water transport kinetics (see FIG. 2*c*) and heat localization. The thermal interface layer 310 is made of a thermally-conductive double-sided adhesive tape.

Figure 2D:
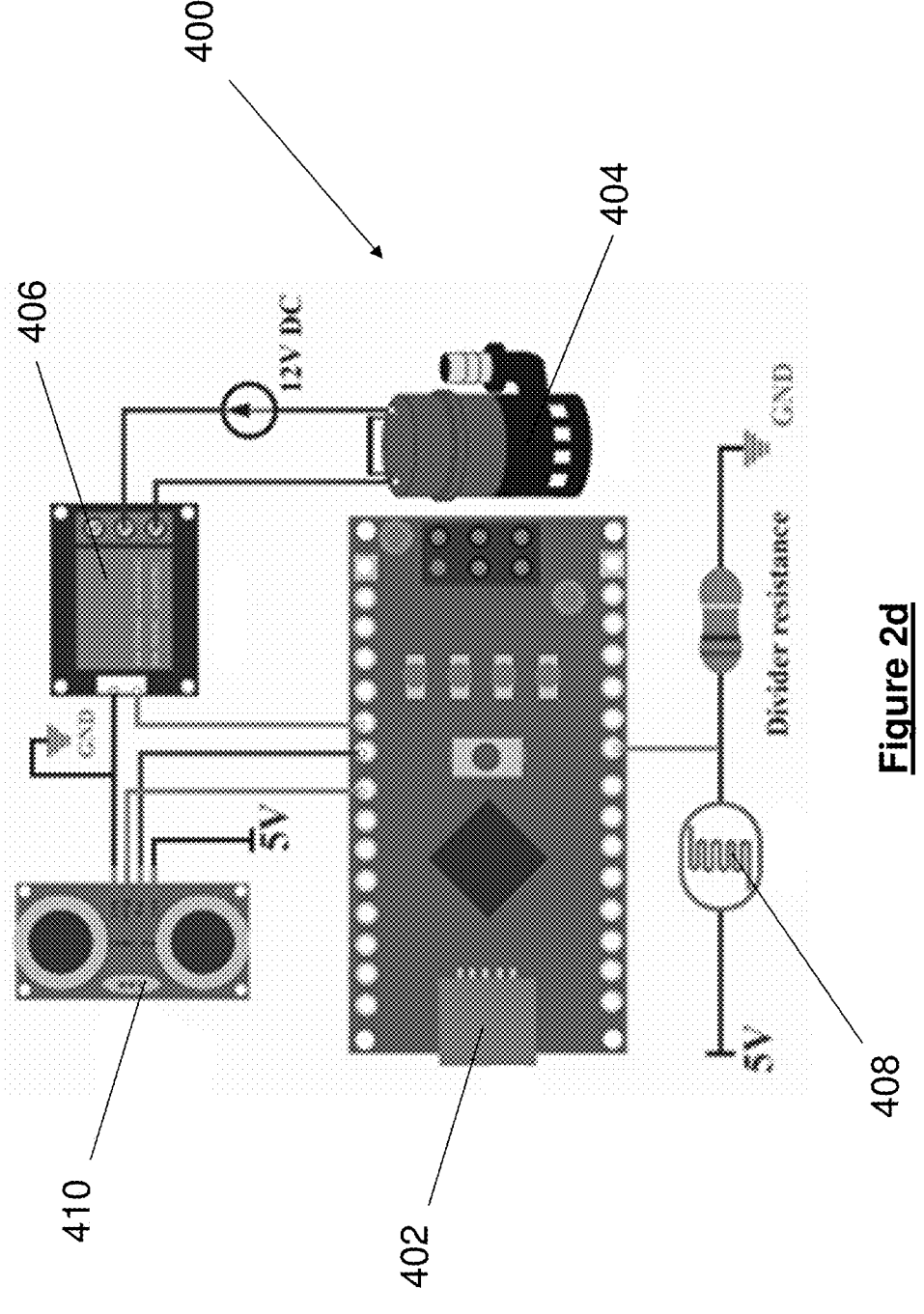
FIG. 2d shows a schematic view of the hardware implementation of the operating strategy of part of a PV system according to the present invention.
Figure 2E:
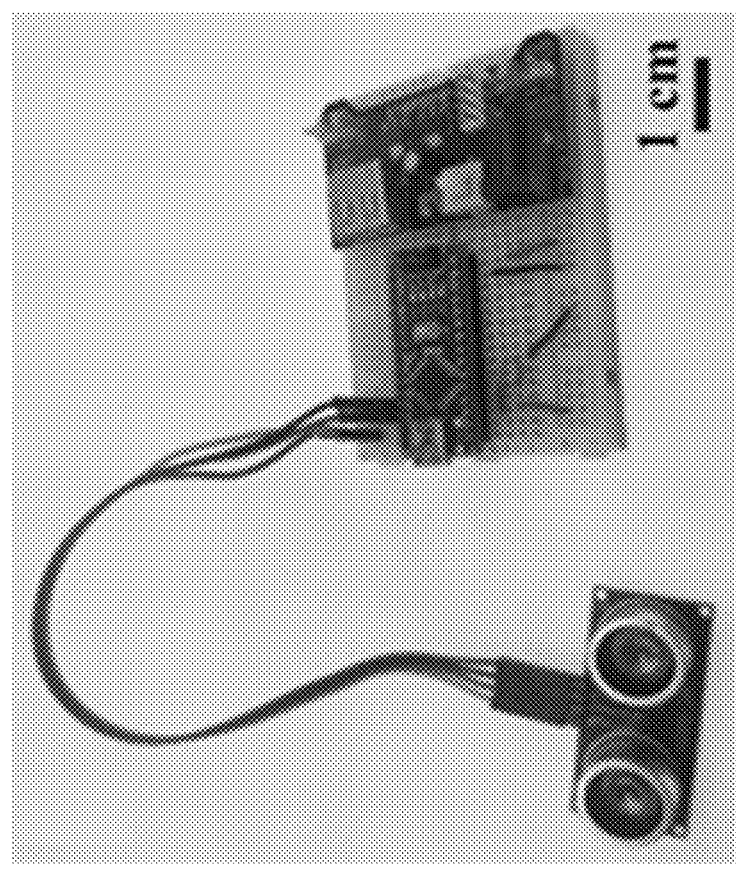
FIG. 2e shows a control platform for the PV system according to the present invention.
Figure 2F:
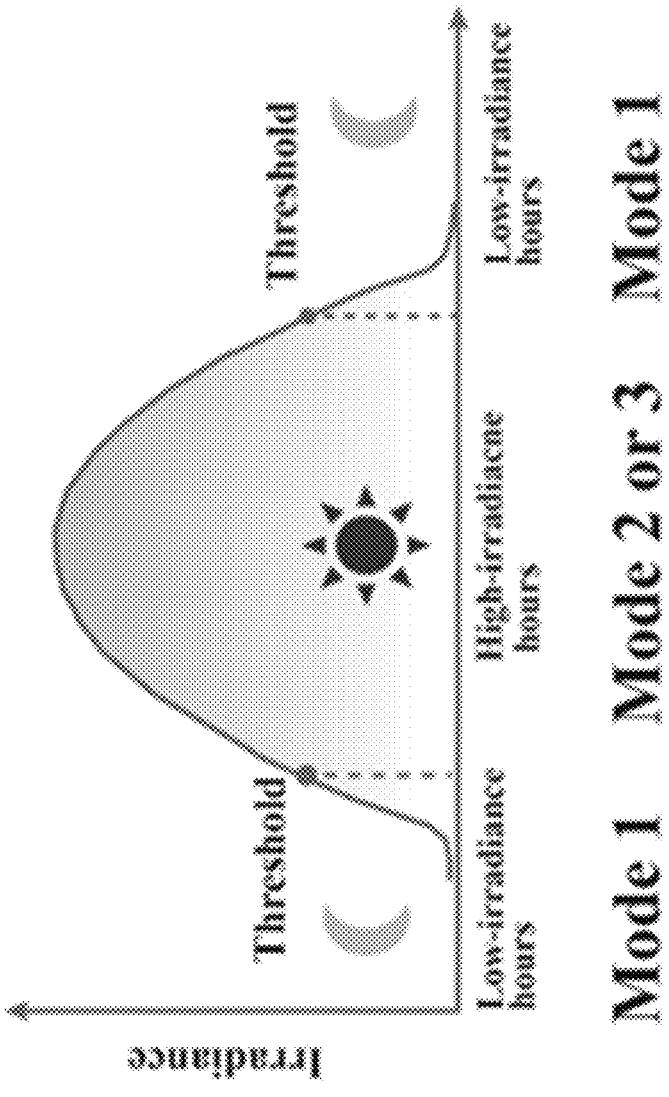
FIG. 2f shows an embedded control strategy of the PV system according to the present invention.

FIG. 2*d* shows a schematic diagram of an adaptive control circuit 400 for use in the PVS-I 100, 200. This circuit 400 uses an Arduino Nano board as a microcontroller unit (MCU) 402 to control a water pump 404 via a relay 406 according to solar irradiance and water levels. With the well-designed circuit and code, the MCU 402 can make climate-adaptive responses according to the signals from a light-dependent resistance (LDR) 408 and a water level sensor in the form of a distance sensor 410. FIG. 2*e* shows the finished control platform with high compactness. FIG. 2*f* displays the embedded control strategy with the daily distribution of the modes. The daily distribution could be customized to meet local needs by setting one or more threshold irradiance.

Figure 3A:
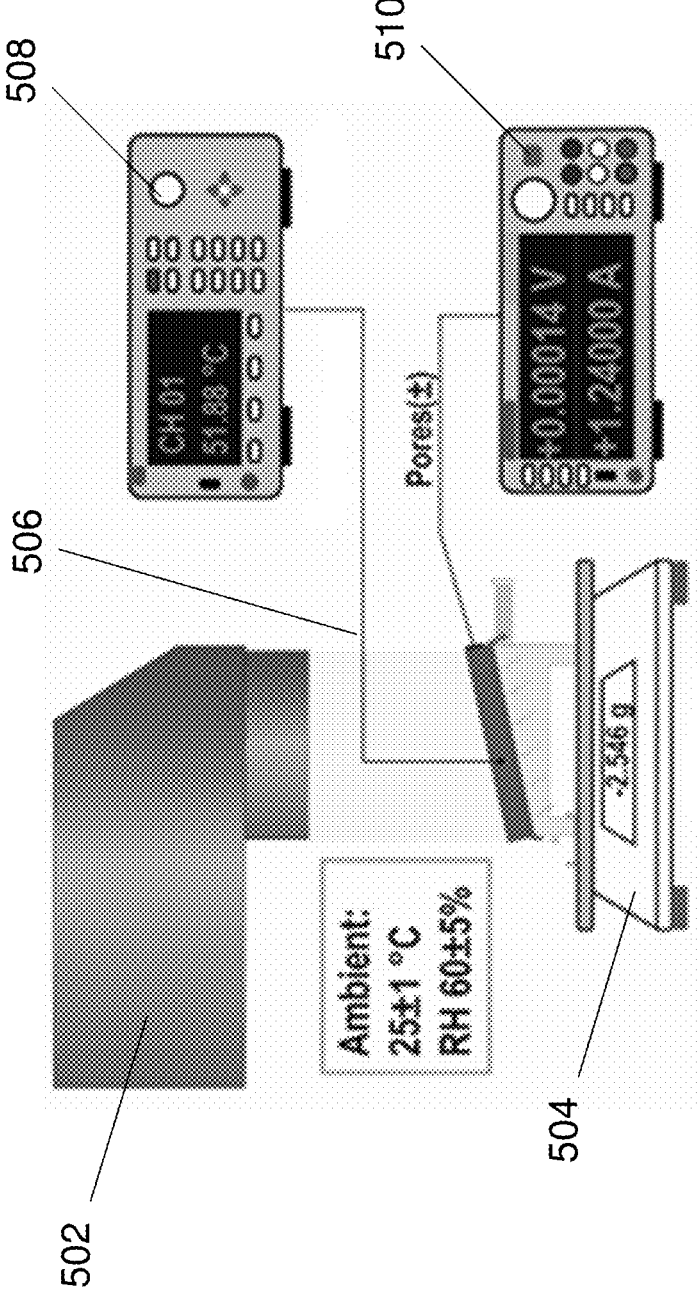
FIG. 3a shows an in-lab test setup of a PV system according to the present invention.

The advances of the PVS-I 100, 200 are demonstrated via a performance comparison of PV system prototypes working in lab-controlled conditions. As is shown in FIG. 3*a*, a solar simulator 502 is used to provide simulated sunlight, an electronic balance 504, a thermocouple 506 connecting the PV system prototypes to a data acquisition (DAQ) module 508, and a source meter unit (SMU) 510 are used to measure the evaporation rate, temperature change, and current&power-voltage (I-V&P-V) curves. The prototypes (including a PV system with an evaporating system according to the present invention (PVS-I), and a PV system with no evaporating system, thus acting as a control (PVS-C)) are tested with different tilt angles (0°, 10°, 20°, 30°, 40°) under three irradiance levels (1-sun, 0.8-sun and 0.6-sun) for 3 hours. The light intensity "1-sun" corresponds to 1 kW/m². This scheme comprehensively evaluates the technology in different areas, as the optimal tilt angles always depend on local latitudes. Limited by the scale of the prototypes, the cooling performance and control circuit are demonstrated separately.

Figure 3B:
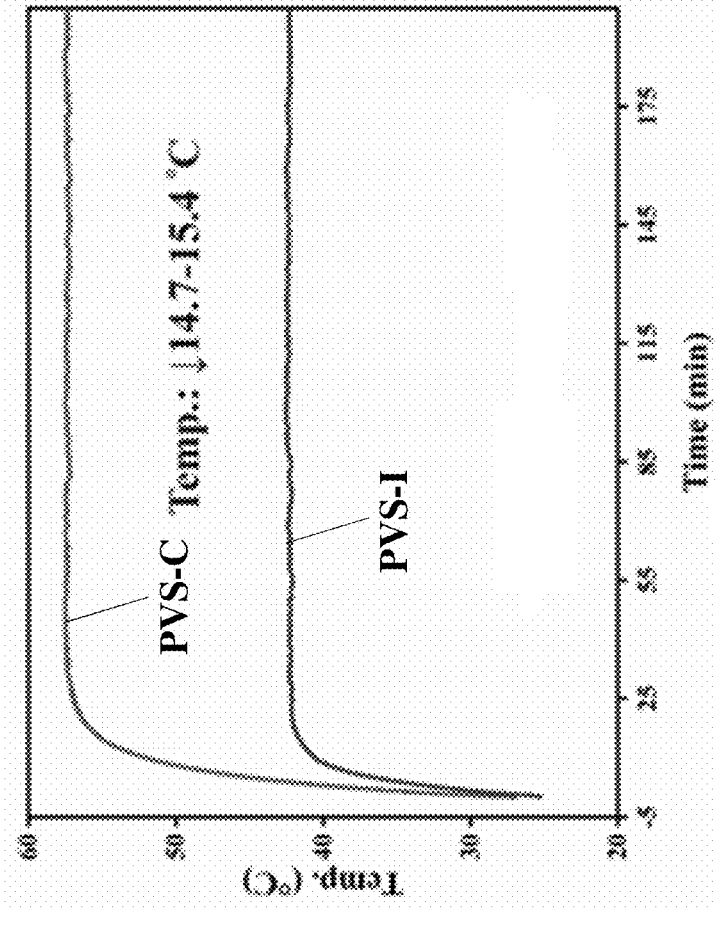
FIG. 3b shows the respective temperature response of a PV system with an evaporating system according to the present invention (PVS-I) and a PV system of the same specification but without an evaporating system according to the present invention (PVS-C), both with a tilt angle of 10° under 1-sun illumination.
Figure 3C:
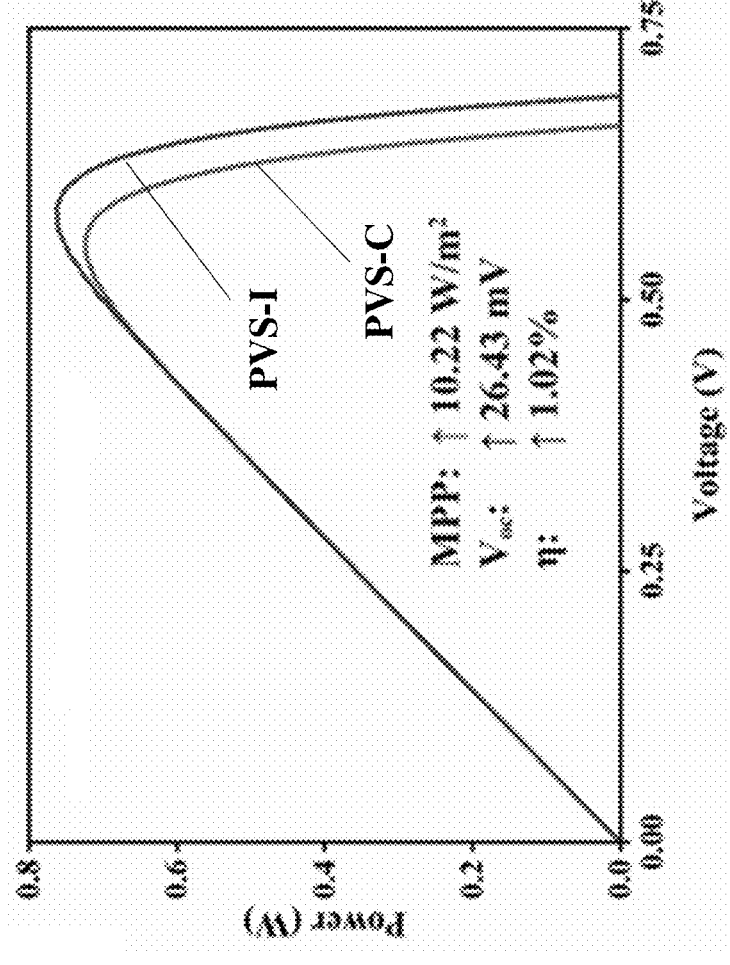
FIG. 3c shows the respective power-voltage (P-V) curve, when reaching thermal-steady state, of the PVS-I and the PVS-C.
Figure 3D:
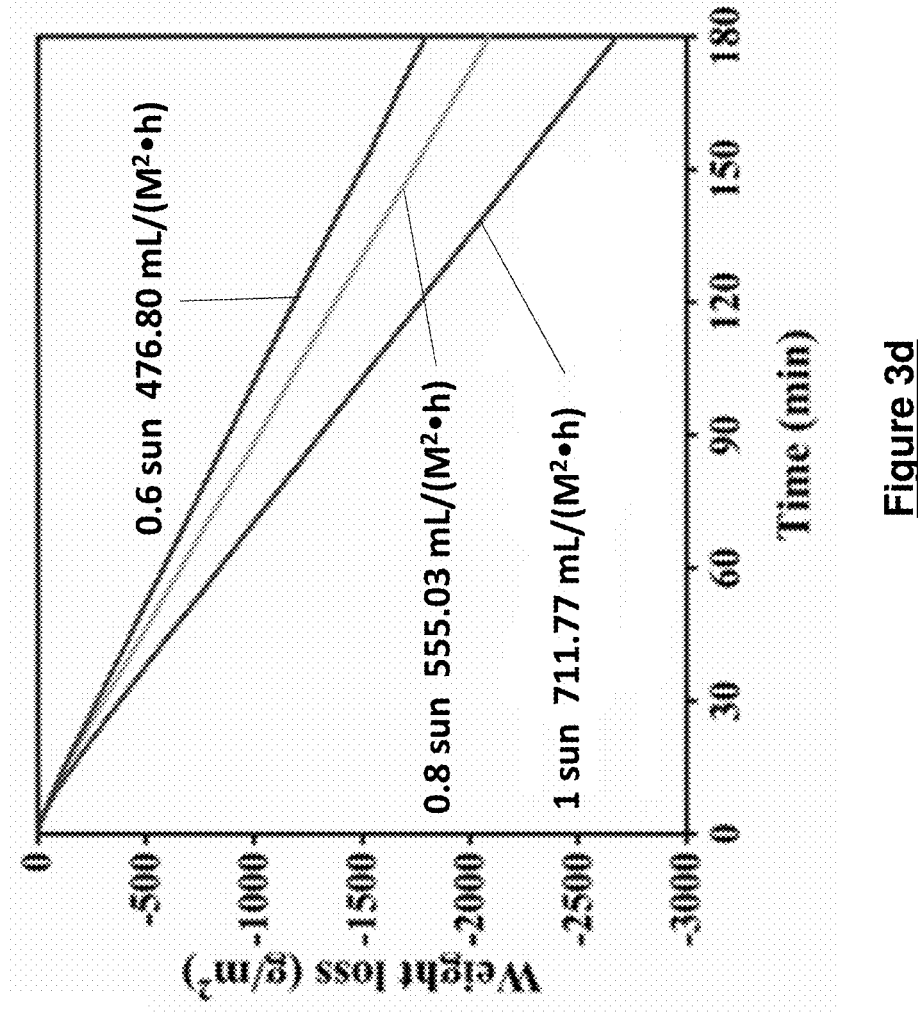
FIG. 3d shows the respective unit weight loss due to evaporation of the PVS-I with a tilt angle of 10° under 1-sun, 0.8-sun, and 0.6-sun illumination.

The results of the PV system prototypes with 10° angle under 1-sun irradiance have been selected as a representative (FIGS. 3*b* to 3*d*). Temperature curves (FIG. 3*b*) of both PV system prototypes reach thermal steady states within around 20 minutes. The steady-state temperature of PVS-I is 42.5±0.5° C. while the PVS-C reaches ~57.5±0.5° C. Interfacial cooling offers a constant temperature drop of 14.7-15.4° C. It has been observed that capillarity drives the water in an upper tank into an upper tail of the evaporator and then triggers the siphon flow within 4 minutes. This slow and passive flow sustains interfacial evaporation. The efficient heat transfer capability of the thin wicking layer facilitates the cooling effect for performance improvement, and a lower tank recovers the unevaporated surplus water for savings.

The P-V curve measurements (FIG. 3c) confirm the benefit of reduced temperature. The shape of both P-V curves are similar, i.e., as the voltage increases, the power first rises to the maximum power point (MPP) and then decreases sharply to zero when the voltage reaches open-circuit voltage ($V_{OC}$). The PVS-I improves the MPP by 10.22 W/m$^2$ and $V_{OC}$ by 26.43 mV, respectively. Therefore, the absolute light-to-electricity conversion efficiency ($\eta$) is improved by 1.02% (absolute improvement).

For 0.8-sun and 0.6-sun cases, the PVS-I offers temperature reductions of 12.6° C. and 9.4° C., respectively. The MPPs are improved by 8.54 W/m$^2$ and 3.28 W/m$^2$, offering absolute efficiency gains of 0.79% and 0.54%, respectively. The unit weight loss of water (as measured by the electronic balance 504) as a function of time is shown in FIG. 3d. The rate of mass change increases at the beginning and reaches a constant value afterward. The steady evaporation rate under 1-sun, 0.8-sun, and 0.6-sun are 711.77 mL/(m$^2$·h), 555.03 mL/(m$^2$·h), and 476.8 mL/(m$^2$·h), respectively.

Because I-V curves are measured several times within an hour, these metrics are averaged per hour in the following analysis to facilitate comparisons. The detailed definitions are as follows:

(a) Short-circuit current $I_{SC}$:

$$I_{sc} = \frac{\sum_{i=1}^{n} I_{sc}^i}{n} \tag{1}$$

where n denotes the total number of I-V curves in the specific hour, and $$I_{sc}^i$$

is the short-circuit current of the $i^{th}$ I-V curve;

(b) Open-circuit voltage $V_{OC}$:

$$V_{oc} = \frac{\sum_{i=1}^{n} V_{oc}^i}{n} \tag{2}$$

where $$V_{oc}^i$$

is the open-circuit voltage of the $i^{th}$ I-V curve;

(c) Maximum power output $P_{max}$:

$$P_{max} = \frac{\sum_{i=1}^{n} P_{max}^i}{n} \tag{3}$$

where $$P_{max}^i$$

is the maximum power of the $i^{th}$ I-V curve; and
(d) Power conversion efficiency $\eta$:

$$\eta = \frac{\frac{\sum_{i=1}^{n} P_{max}^i}{n}}{\frac{\sum_{i=1}^{n} G^i A_m}{n}} = \frac{\sum_{i=1}^{n} P_{max}^i}{\sum_{i=1}^{n} G^i A_m} \tag{4}$$

where $G^i$ is the irradiance on the module plane at the moment of measuring the $i^{th}$ I-V curve, and A, is the area of the PV module of the PV system.

Figure 3E:
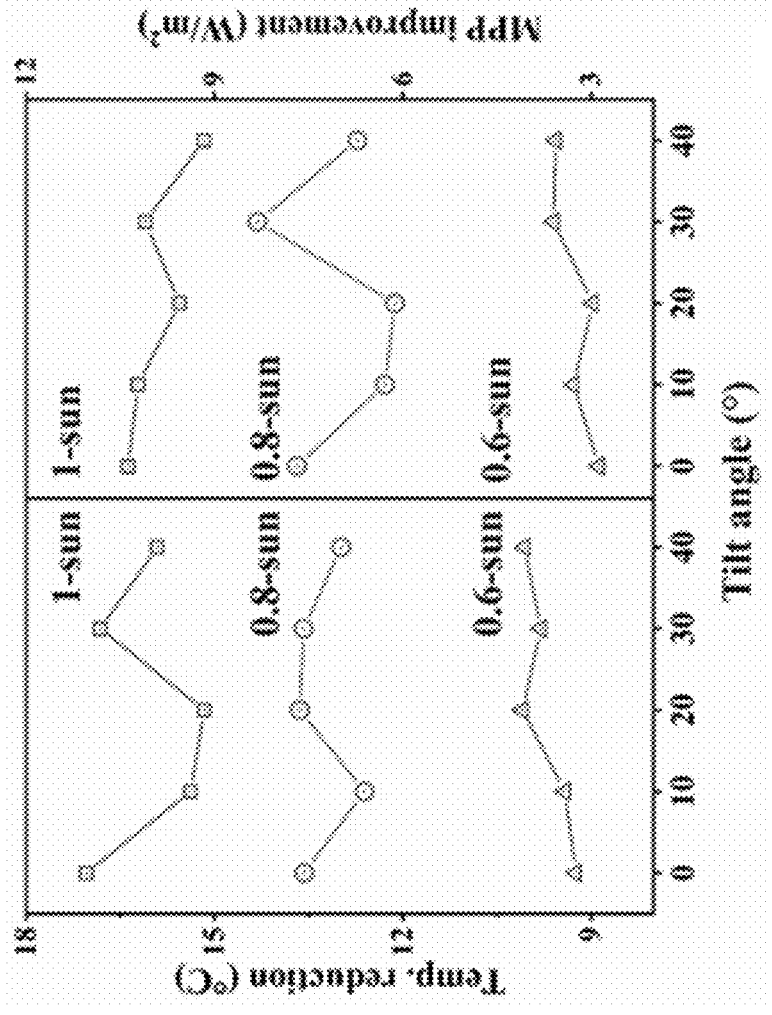
FIG. 3e shows the respective steady-state temperature reduction and maximum power point (MPP) improvements of the PVS-I as a function of the tilt angle.
Figure 3F:
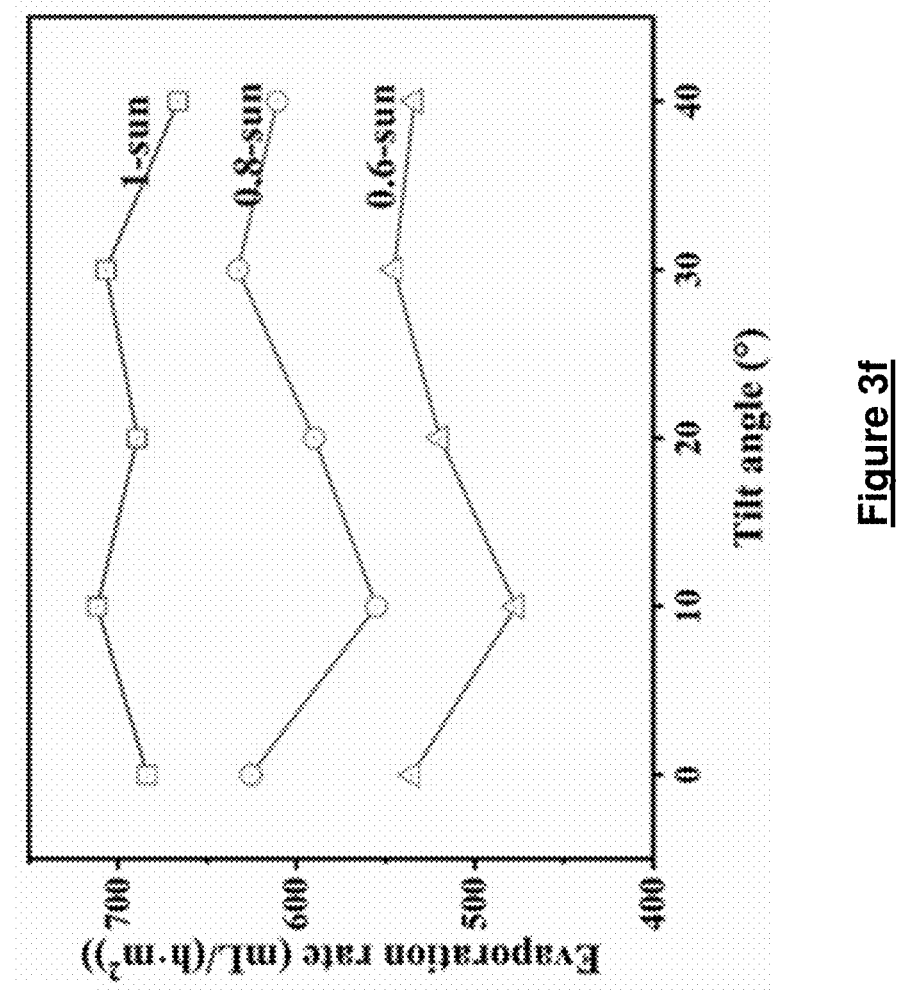
FIG. 3f shows the respective evaporation rate of the PVS-I as a function of the tilt angle.

It has been found that the general trends of temperature response, electrical performance improvement, and weight loss are largely consistent across the PVS-I and PVS-C with different tilt angles. The steady temperature reduction and MPP improvement of different tilt angles are summarized in FIG. 3e. Under 1-sun irradiance, the temperature of the PVS-I can be reduced by 15.1-17.3° C., as compared to that of the PVS-C, together with corresponding MPPs improvement of 9.16-10.38 W/m$^2$. Under 0.8-sun irradiance, the temperature of the PVS-I can be reduced by 12.6-13.6° C., as compared with that of PVS-C, together with corresponding MPPs improvements of 6.13-8.31 W/m$^2$. Under 0.6-sun, the temperature of PVS-I can be reduced by 9.2-10.1° C., as compared to that of PVS-C, together with corresponding MPPs improved by 2.87-3.60 W/m$^2$. These results confirm that employing thermal management during high irradiance hours can generate higher benefits. The evaporation rate (as shown in FIG. 3f) under 1-sun, 0.8-sun, and 0.6-sun irradiance are 666.26-711.77 mL/(m$^2$·h), 555.03-632.72 mL/(m$^2$·h), and 476.8-534.96 mL/(m$^2$·h), respectively. The summarized evaporation rate indicates that irradiance is the primary factor determining water consumption. Theoretically, a larger tilt angle contributes to a larger height difference between the two ends of the evaporator. However, due to the rich and tortuous pore structure of the evaporator material, the flow speed is relatively slow, i.e., there is limited sensible heat rejection by the siphoning flow, and interfacial evaporation dominates the heat dissipation.

Given the above in-lab results and the changing ambient conditions in practice, it is believed that benefits from cooling can be maximized by integrating an efficient operation strategy. Thus, 600 W/m$^2$ has been chosen as a threshold of high irradiance and sunny weather to develop a control circuit. The LDR 408 measures the irradiance on the panel prototypes and returns a value between 0-1023 to the controller 402 according to the irradiance level. The LDR 408 has a stable returned value under the provided irradiance series of 0-1200 W/m$^2$. When the irradiance is higher than 600 W/m$^2$, the voltage between the relay 406 moves from 0 V to 5 V, enabling the PVS-I to move from Mode 1 to 3, and the water pump 404 operates to fill the water to the tank. Once the water reaches a preset level, the voltage between the relay 406 returns to 0 V, enabling the PVS-I to move to Mode 2.

Figure 4A:
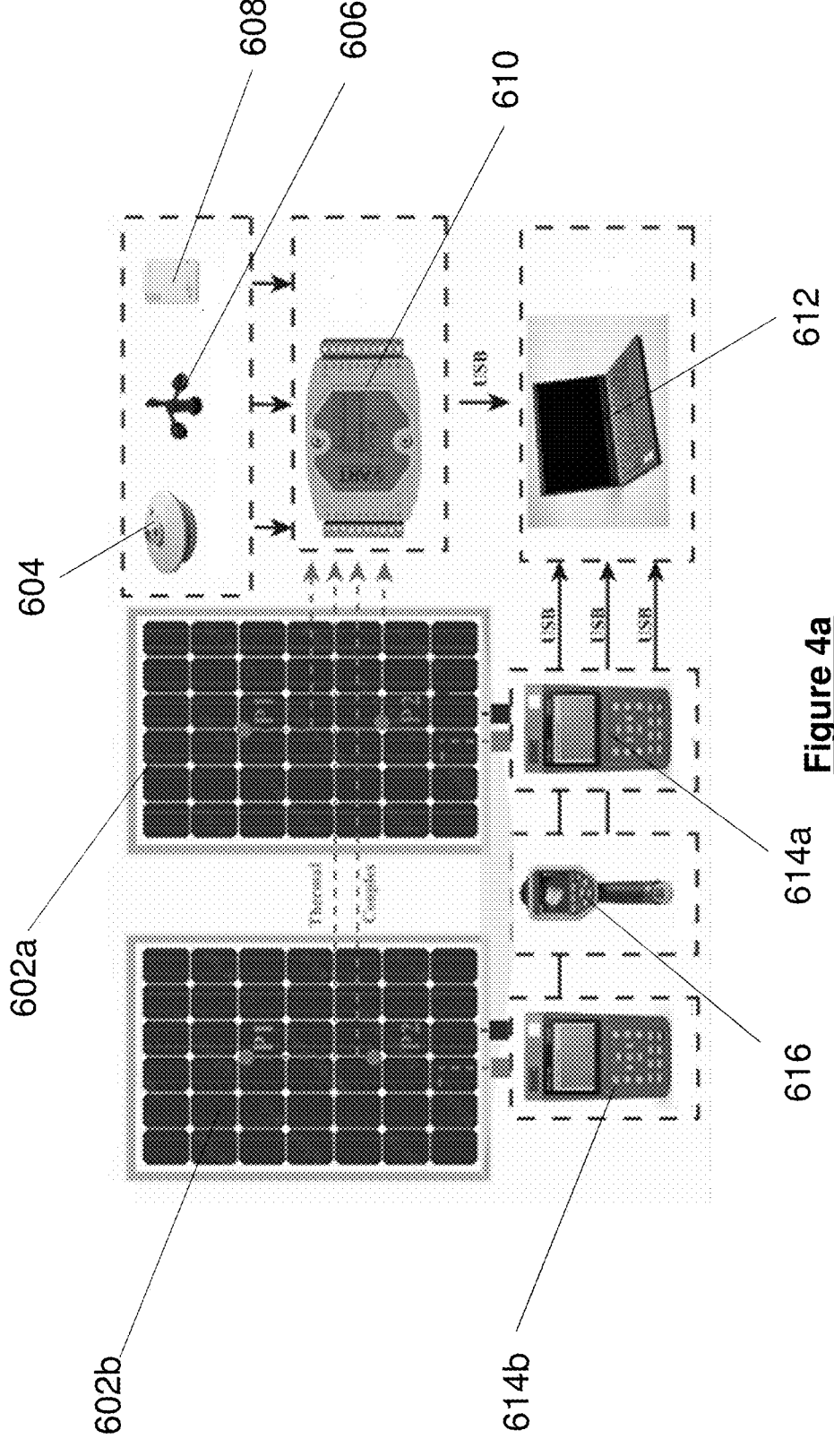
FIG. 4a shows a schematic view of an experimental setup of part of the PVS-I.

The PSV-I was subsequently applied on a commercial PV system and its performance was compared with the same PV system working alone (i.e., with no evaporating system). The comparison test was conducted on the rooftop at the campus of Hong Kong City University, of Kowloon Tong, Kowloon, Hong Kong, China (22° 15'N, 114° 15'E) ("Experiment Site") from 10:00 on 21 Dec. 2022 ("Day #1") to 24:00 on 22 Dec. 2022 ("Day #2"). FIG. 4a shows schematically the test setup. Two PV systems were provided for the comparison test, one being a PVS-I (i.e., a PV system with an evaporating system according to the present invention) 602a, the other being a PVS-C (i.e., a PV system with no evaporating system according to the present invention, acting as a control) 602b. The PV modules of the PVS-I and PVS-C were south-facing and were fixed on a frame with a 30° tilt angle.

Meteorological sensors (including an irradiance sensor 604, a wind speed sensor 606, and a temperature and humidity sensor 608) were provided for sensing the relevant weather conditions and inputting the corresponding data to a DAQ module 610 for subsequent input to a computer 612. Thermocouples were attached to two points (P1, P2) of each of the PVS-I 602a and PVS-C 602b for obtaining and inputting relevant data to the DAQ module 610, for subsequent input to the computer 612. Each of the PVS-I 602a and PVS-C 602b was connected with a respective I-V analyser 614a, 614b, for providing the current and voltage data of the respective PVS-I 602a and PVS-C 602b to the I-V analysers 614a, 614b, for subsequent input into the computer 612. An infrared (IR) camera 616 was also provided to obtain IR images of the PV modules of the respective PVS-I 602a and PVS-C 602b, again to be inputted into the computer 612.

Figure 4C:
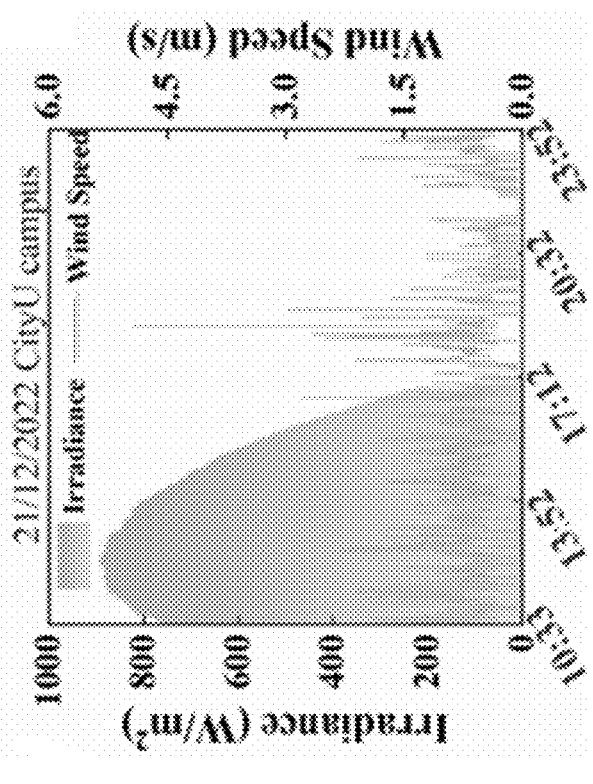
FIG. 4c shows the solar irradiance and wind speed at the Experiment Site on 21 Dec. 2022.
Figure 4C:
Figure 4B:
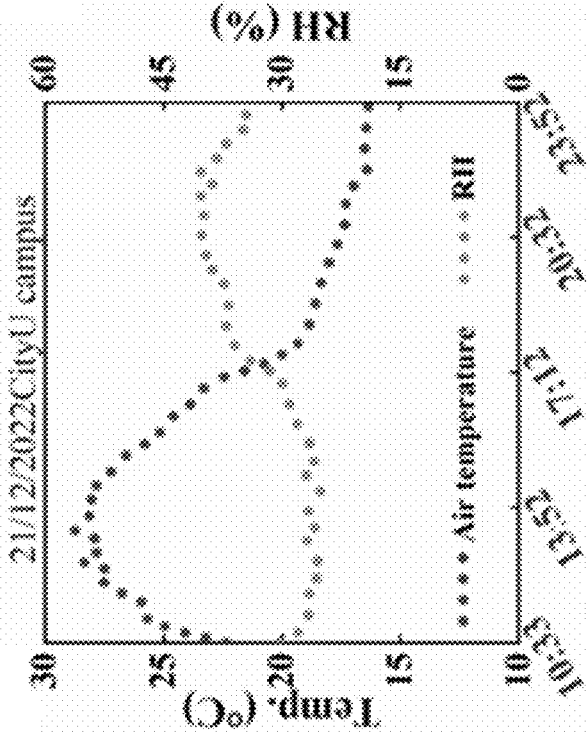
FIG. 4b shows the air temperature and relative humidity at the campus of Hong Kong City University, of Kowloon Tong, Kowloon, Hong Kong, China (the "Experiment Site") on 21 Dec. 2022 ("Day #1")
Figure 4D:
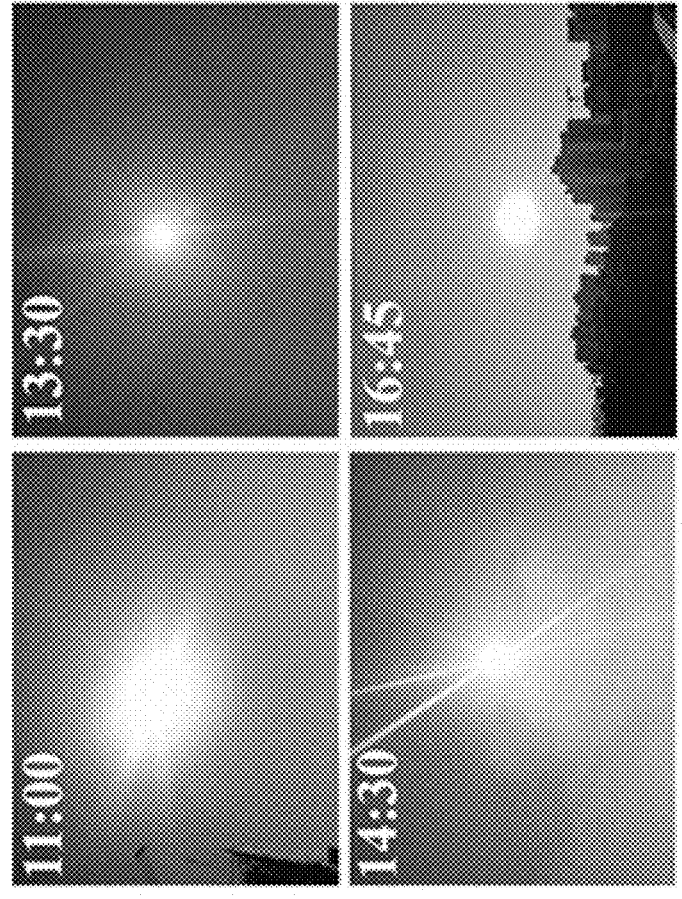
FIG. 4d shows sky conditions at the Experiment Site on 21 Dec. 2022.

FIGS. 4b to 4d show the weather conditions of the Experiment Site on 21 Dec. 2022 (Day #1). Air temperature was 23.5-28.8° C. during the sunlight hours and dropped to 16.3-18.5° C. at night. The relative humidity (RH) was 25.09-40.67%, which was already locally dry weather. The maximum solar irradiance reached 895.37 $W/m^2$, and there were almost 3 hours of solar irradiance over 800 $W/m^2$. The average wind speed was 0.61 m/s, and the sky was clear all day. These features show a typical sunny day in the transition season in the sub-tropical zone, a typical PV working condition.

Figures 4E, 4F:
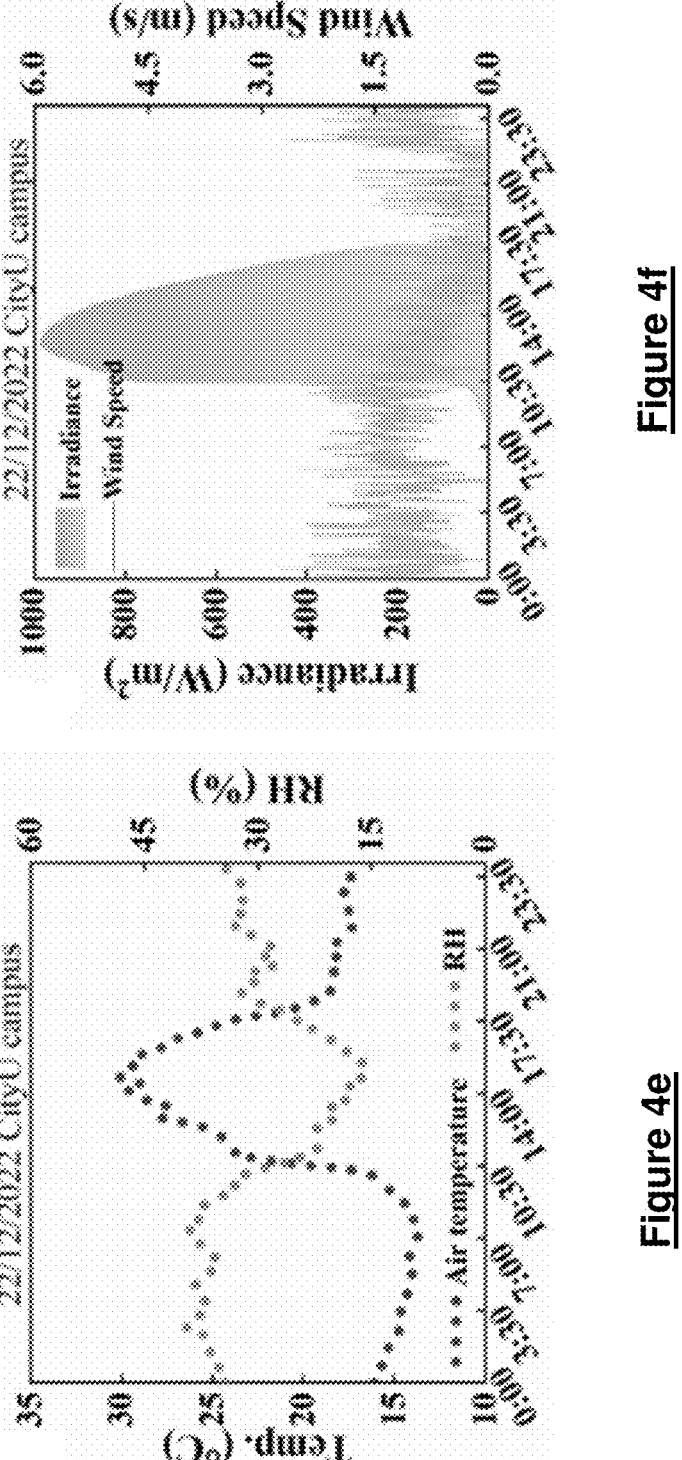
FIG. 4e shows the air temperature and relative humidity at the Experiment Site on 22 Dec. 2022 ("Day #2")
FIG. 4f shows the solar irradiance and wind speed at the Experiment Site on 22 Dec. 2022.
Figure 4G:
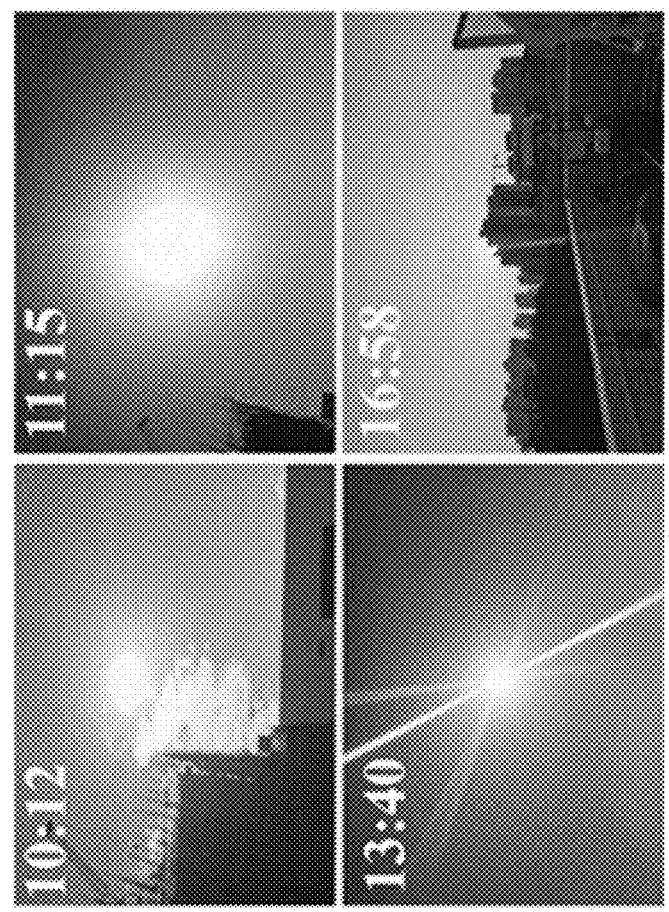
FIG. 4g shows sky conditions at the Experiment Site on 22 Dec. 2022.

FIGS. 4e to 4g show the weather conditions of the Experiment Site on 22 Dec. 2022 (Day #2). The temperature in the daytime was 13.7-31.1° C. with an average of 19.2° C. The RH was 15.73-35.50%, and the average value was only 30.19%. Predictably, this dry climate would facilitate evaporation. The maximum solar irradiance reached 992 $W/m^2$, and 2.5 hours of solar irradiance were above 940 $W/m^2$. There was a still breeze most of the time, with an average wind speed of 0.86 m/s. According to the sky condition results (see FIG. 4g), a dense cloud blocked the sun before 10:10. Then the weather became very clear and open until the sun went down behind the buildings. As such, solar irradiance witnessed a rapid increase at 09:56 and a sudden fall at 16:50. This fast-changing condition imposed dynamic effects on the device, offering a good task for testing the present invention.

Figures 5A, 5B:
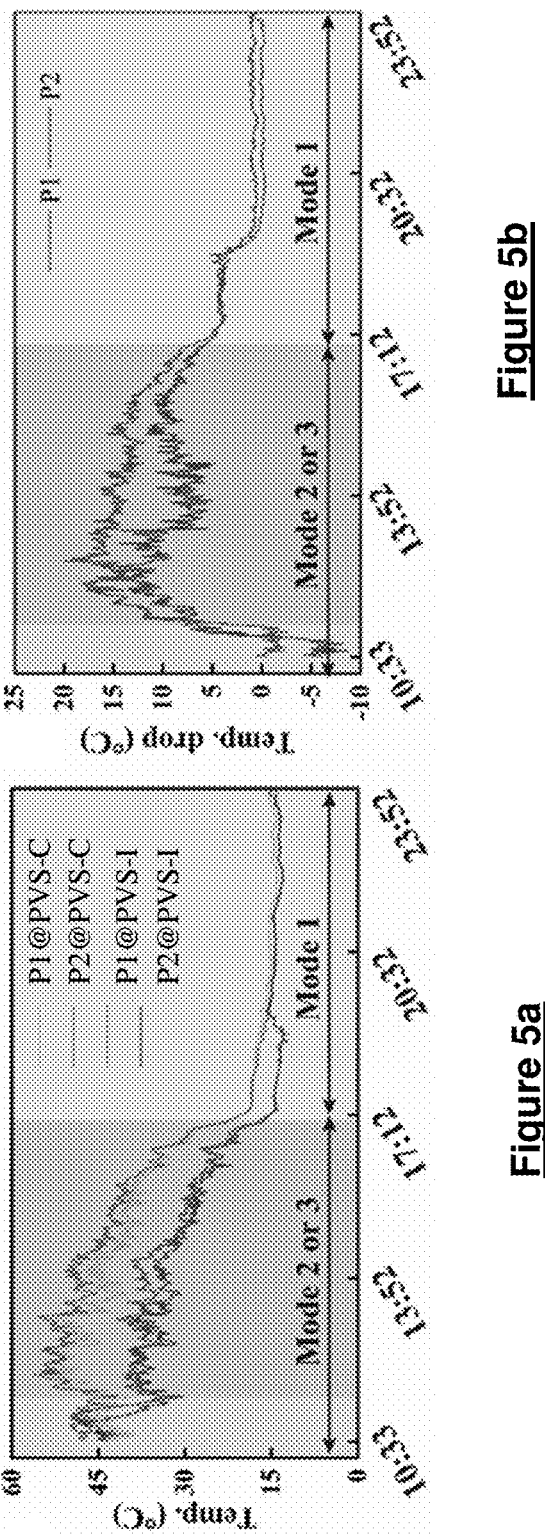
FIG. 5a shows the respective temperature variation of the PVS-I and the PVS-C at the Experiment Site on Day #1.
FIG. 5b shows the respective temperature drop of the PVS-I and the PVS-C at the Experiment Site on Day #1.
Figure 5C:
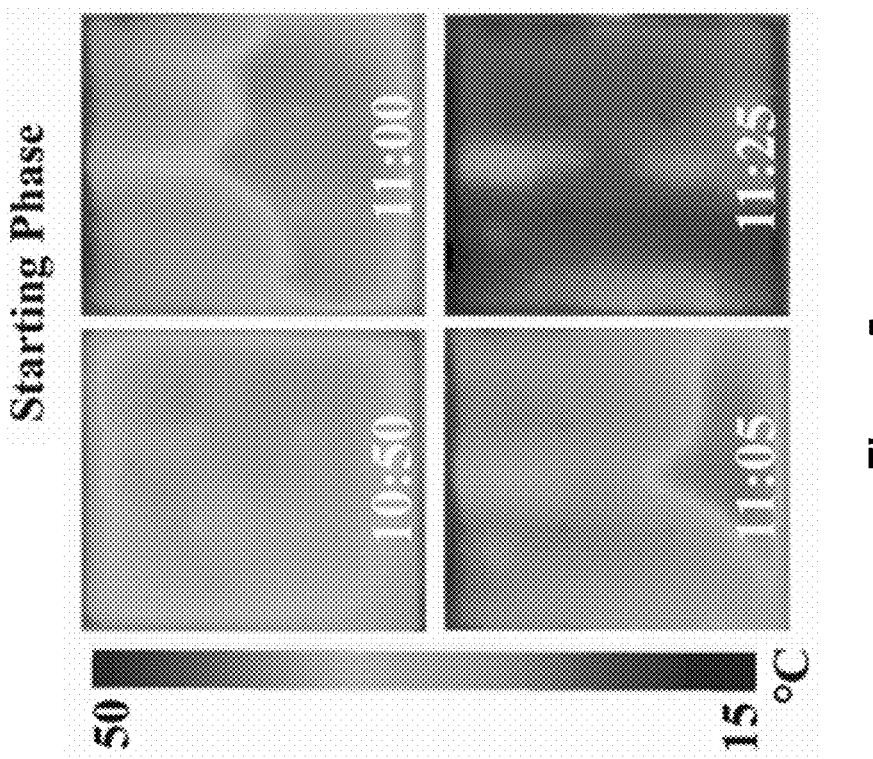
FIG. 5c shows infrared (IR) images of the PVS-I and the PVS-C at the Experiment Site in the starting phase on Day #1.
Figure 5D:
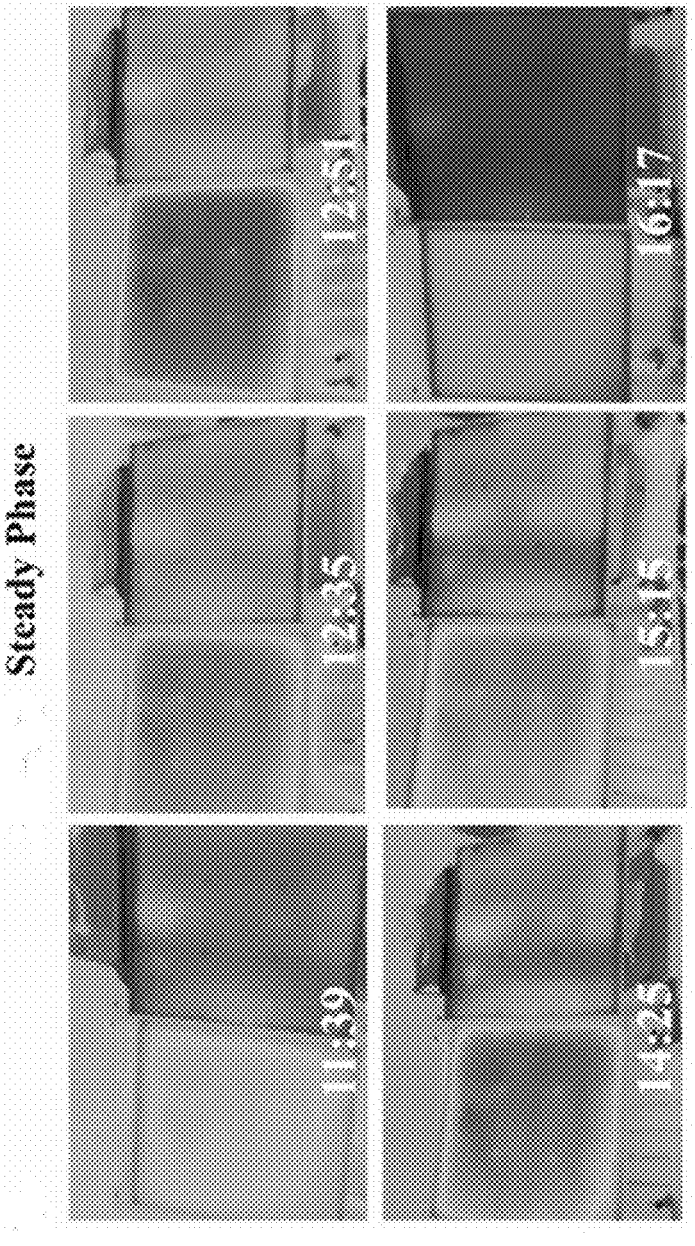
FIG. 5d shows infrared (IR) images of the PVS-I and the PVS-C at the Experiment Site in the steady phase on Day #1.

FIGS. 5a and 5b show the temperature variation of the PV modules of the respective PVS-I 602a and PVS-C 602b and the corresponding temperature drop, respectively. The temperature field during the experiment is shown in FIGS. 5c and 5d. According to the temperature variation characteristics, the entire process on Day #1 can be divided into three zones: blue zone, purple zone, and orange zone, respectively.

Figure 5E:
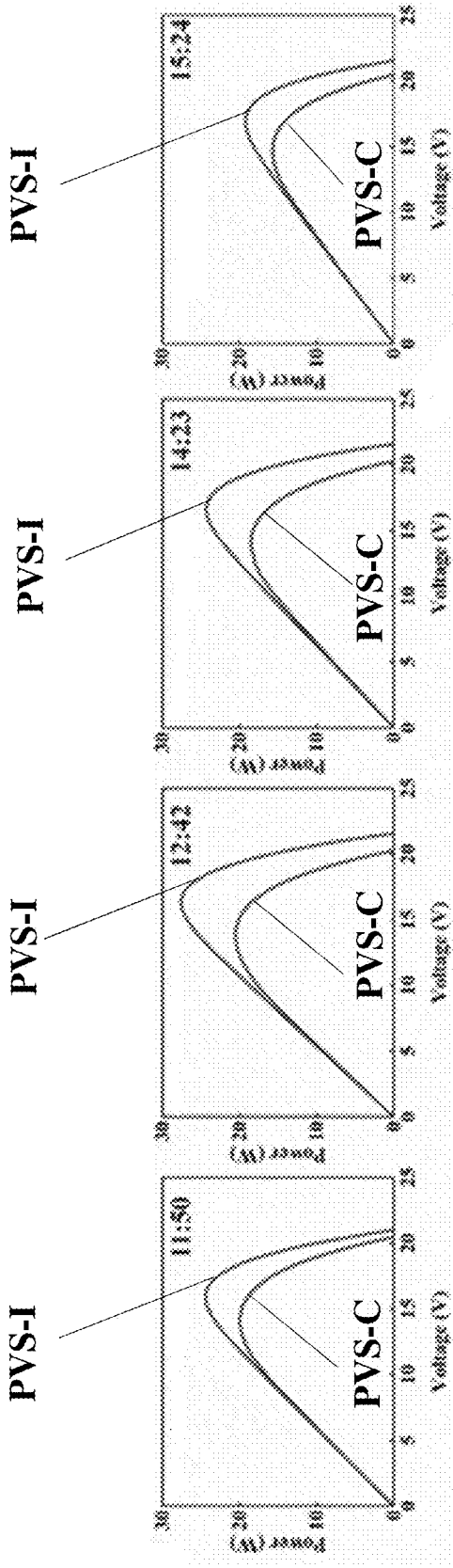
FIG. 5e shows the respective P-V curves of the PVS-I and the PVS-C at the Experiment Site on Day #1.
Figure 5F:
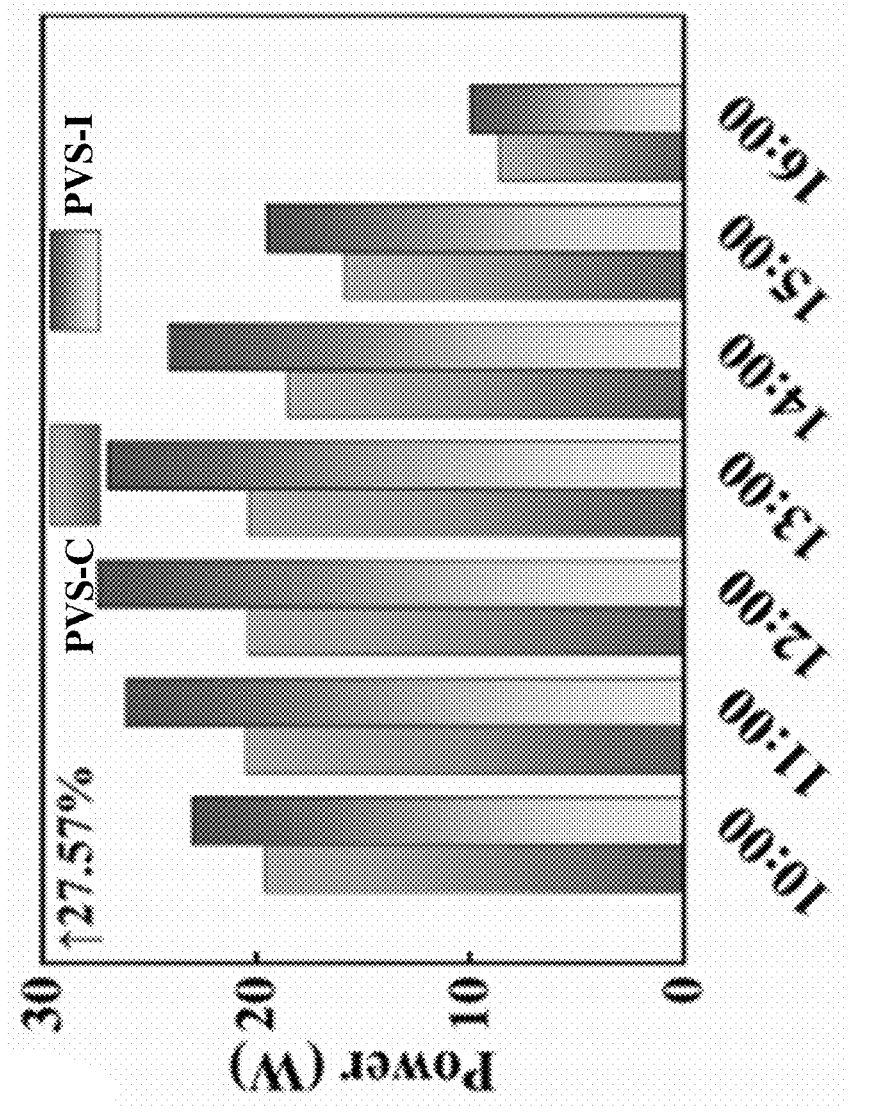
FIG. 5f shows the respective hourly averaged maximum power output of the PVS-I and the PVS-C at the Experiment Site on Day #1.
Figure 5G:
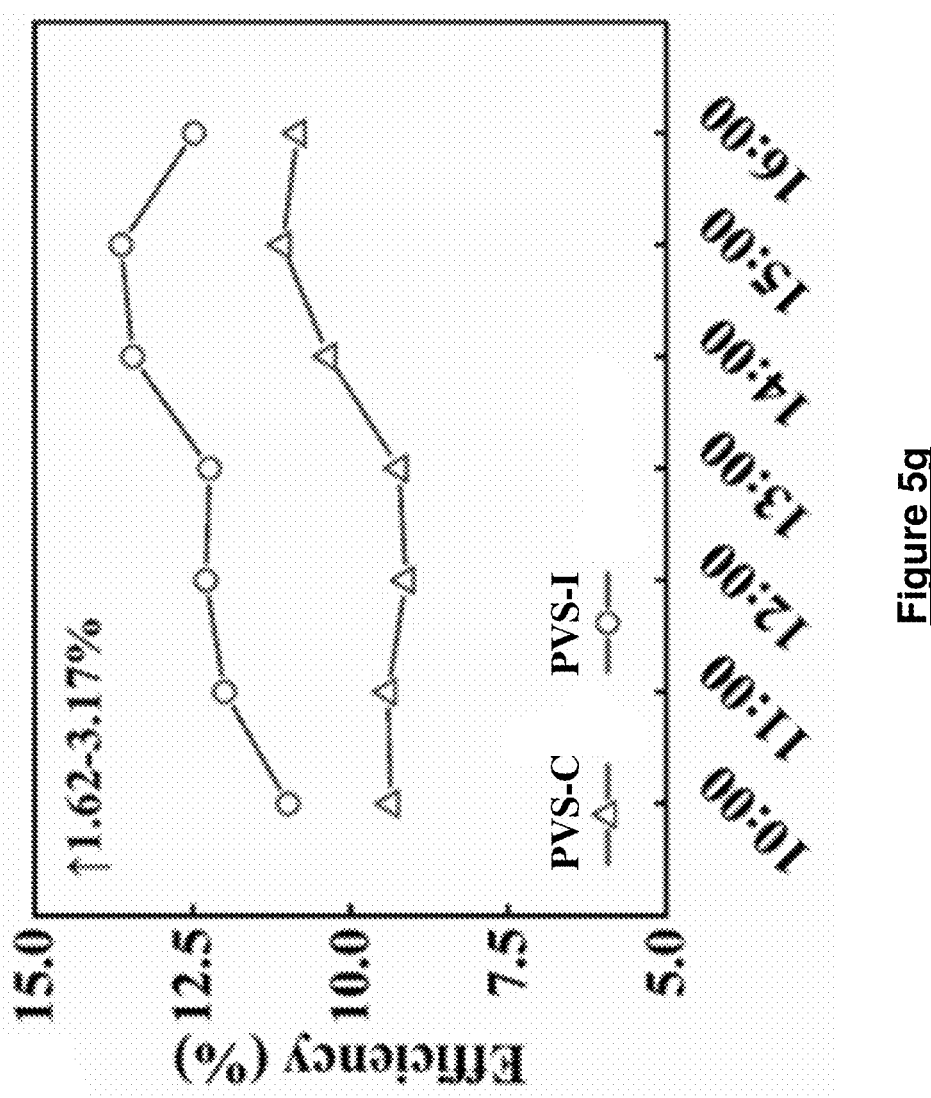
FIG. 5g shows the respective power conversion efficiency of the PVS-I and the PVS-C at the Experiment Site on Day #1.

In the blue zone, since the solar irradiance was already higher than 600 $W/m^2$ after installation, the PVS-I 602a switched to Mode 3 directly. As the siphoning water flow moved down through the evaporator, temperatures at two selected points (P1@PVS-I, P2@PVS-I) in the PVS-I 602a decreased sequentially within 14 minutes, indicating cooling effects were generated. IR images in FIG. 5c show this process: the movement of water flow resulted in a cooling front in the temperature field; as the front moved down, the entire PV module was ultimately cooled. The nearby areas were not uniformly cooled as the downstream region because of the presence of other component and edge effect. As a result, the temperature at P1@PVS-I was always slightly higher than that at P2@PVS-I. The PVS-I 602a entered a steady state in the purple zone with a stable siphoning flow in the evaporator, leading to a substantial cooling effect. During the three high-irradiance hours (with solar irradiance >800 $W/m^2$), the temperature of the PV module of the PVS-C 602b fluctuated around 53.5° C., and the highest temperature was 56.3° C. Comparatively, the temperature of the PV module of the PVS-I 602a was suppressed to around 37.5° C., and the maximum temperature drop reached 20.0° C. These differences can be observed distinctively in the IR figures in FIG. 5d. Finally, the PSV-I 602a entered Mode 1 in the orange zone as the irradiance was lower than 600 $W/m^2$. Although there was no water supply to PVS-I 602a, the cooling effect lasted for nearly another 2 hours after entering Mode 1 due to the remaining water in the evaporator. Benefits from thermal management finally convert into electrical performance gains. As indicated in FIG. 5e, cooling contributed to a P-V curve with a higher maximum power due to the improved $V_{OC}$. Moreover, the results agree with the results in the in-lab test that temperature has a negligible effect on short-circuit current $I_{SC}$ while the $V_{OC}$ can be increased significantly. As indicated in FIG. 5f, the power output of the PVS-I 602a was much higher than that of the PVS-C 602b, especially in high-irradiance hours (11:00-14:00), in which cooling contributed to an increase of 5.63-7.06 W. In turn, the power conversion efficiency as shown in FIG. 5g increased by 1.62-3.17%. It also means that the PVS-I 602a generated 27.57% more electricity than the conventional PVS-C 602b.

Figures 6A, 6B:
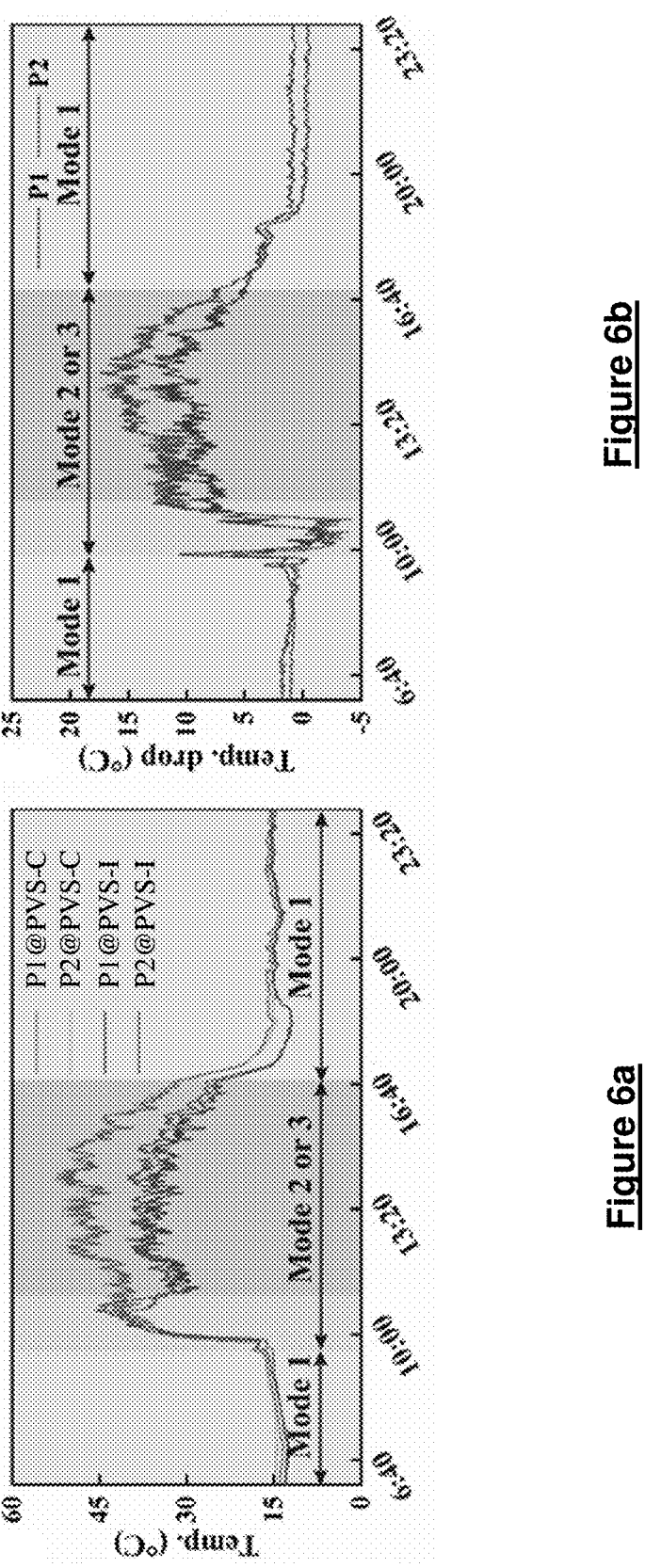
FIG. 6a shows the respective temperature variation of the PVS-I and the PVS-C at the Experiment Site on Day #2.
FIG. 6b shows the respective temperature drop of the PVS-I and the PVS-C at the Experiment Site on Day #2.
Figure 6C:
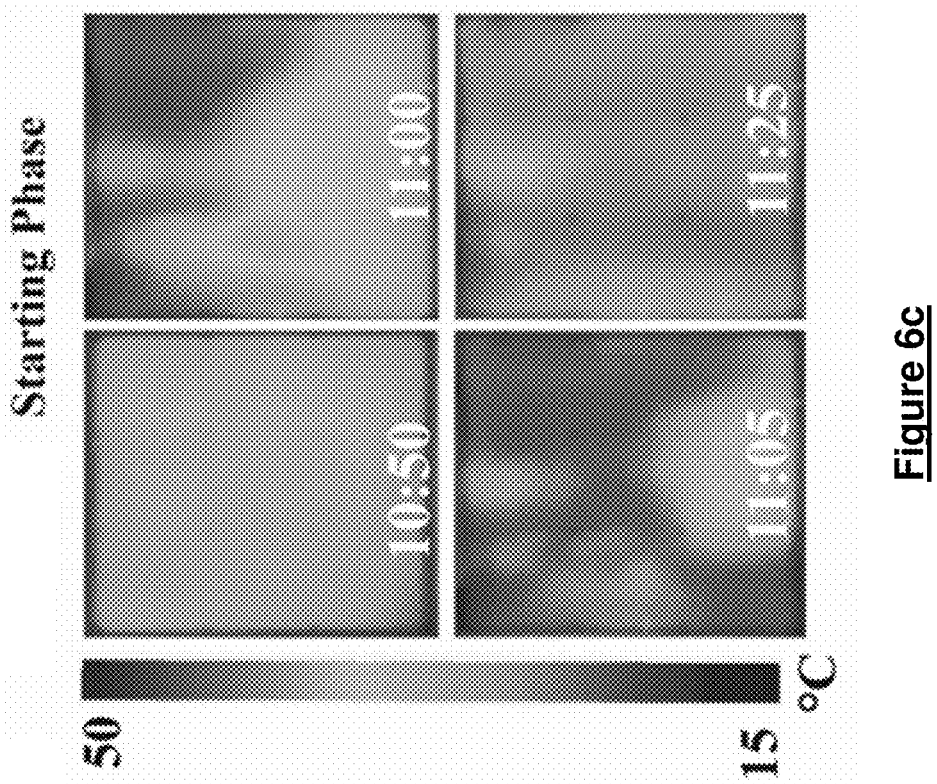
FIG. 6c shows infrared (IR) images of the PVS-I and the PVS-C at the Experiment Site in the starting phase on Day #2.

Similarly, the temperature evolution on Day #2 can be divided into 3 phases (as shown in FIGS. 6a and 6b). Because the experiment lasted all day, there was an orange zone in the morning and in the night. In the orange zone in the morning, as the solar irradiance was below 600 $W/m^2$, the PVS-I 602a was in Mode 1 for energy saving. The temperatures of the PV modules of both the PVS-I 602a and the PVS-C 602b thus showed the same patterns in FIG. 6a. In the blue zone, as irradiance surged from 155.13 $W/m^2$ to 830.5 $W/m^2$, the PVS-I 602a instantly woke up and moved to Mode 3 to generate interfacial cooling. As a result, the rising trend of temperature was suppressed rapidly in the PVS-I 602a while it continued to increase in the PVS-C 602b. Similar cooling front propagation can be found in FIG. 6c.

Figure 6D:
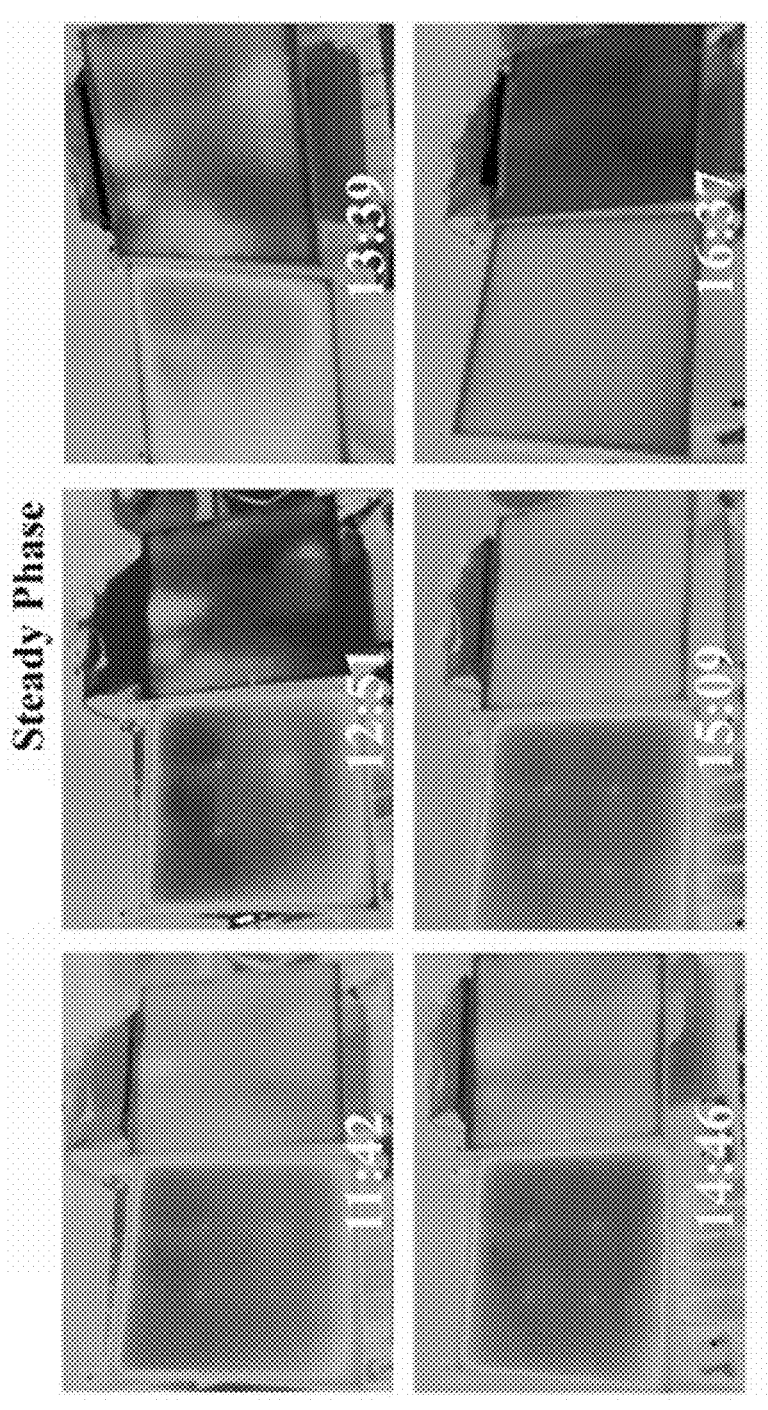
FIG. 6d shows infrared (IR) images of the PVS-I and the PVS-C at the Experiment Site in the steady phase on Day #2.

After entering the purple zone, there was a sustainable cooling effect in the PVS-I 602a. During the high-irradiance hours (solar irradiance >940 $W/m^2$), the temperature of the PVS-C 602b varied between 47.7° C. and 53.1° C. while the PVS-I 602a only fluctuated between 27.8° C. and 40.2° C. with the maximum temperature drop reaching 17.7° C. These significant differences can be instantly observed in the IR images in FIG. 6d. Finally, in the orange zone in the night, the PVS-I 602a returned to Mode 1 when the solar irradiance was lower than 600 $W/m^2$. Similarly, the cooling lasted for nearly another 2.5 hours after entering Mode 1 due to the remaining water in the evaporator in the PVS-I 602a.

Figure 6E:
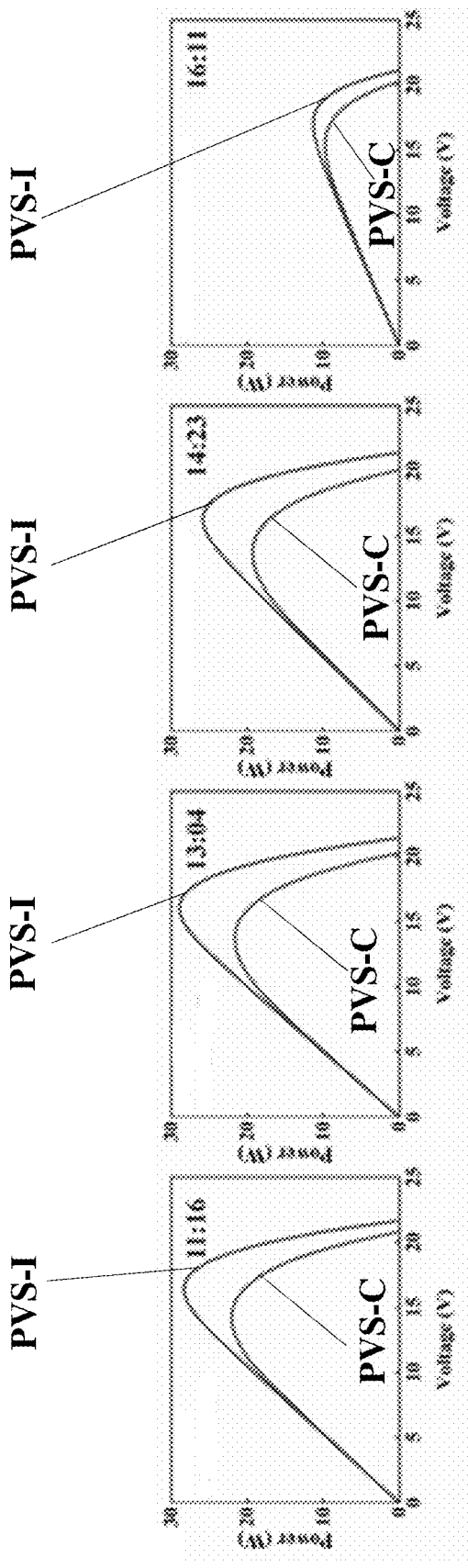
FIG. 6e shows the respective P-V curves of the PVS-I and the PVS-C at the Experiment Site on Day #2.
Figure 6F:
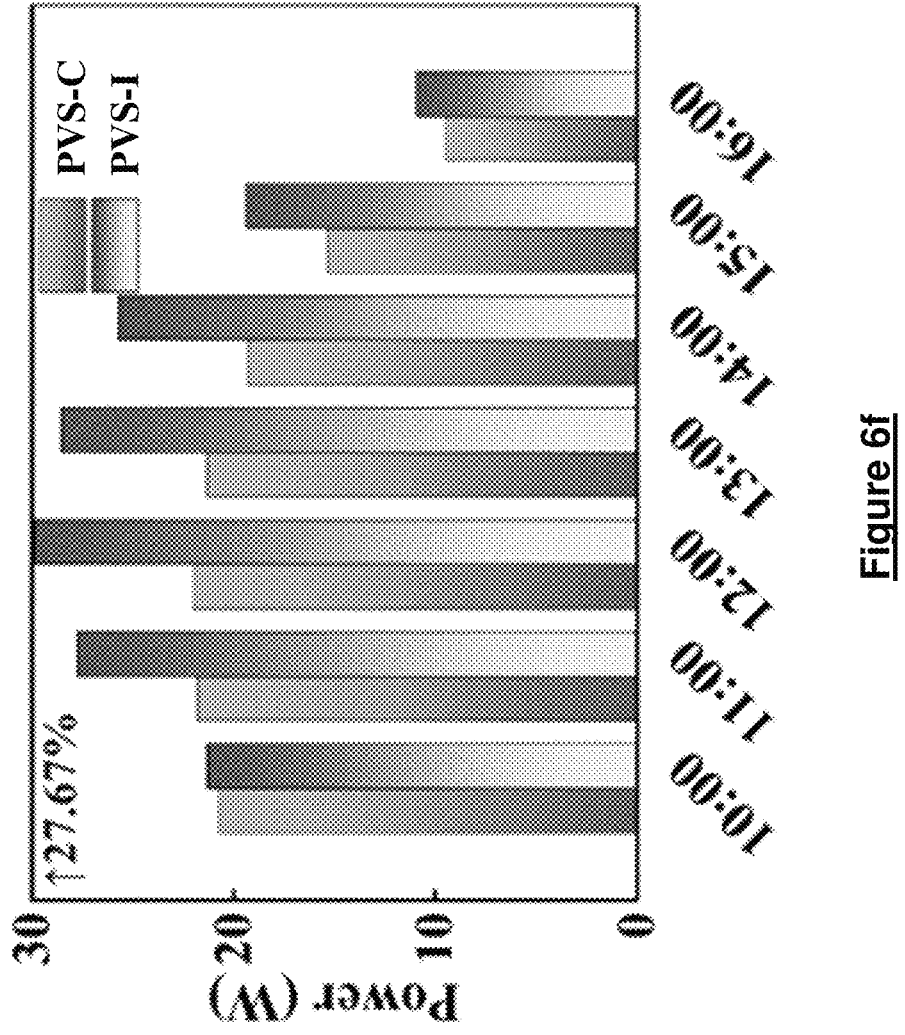
FIG. 6f shows the respective hourly averaged maximum power output of the PVS-I and the PVS-C at the Experiment Site on Day #2.
Figure 6G:
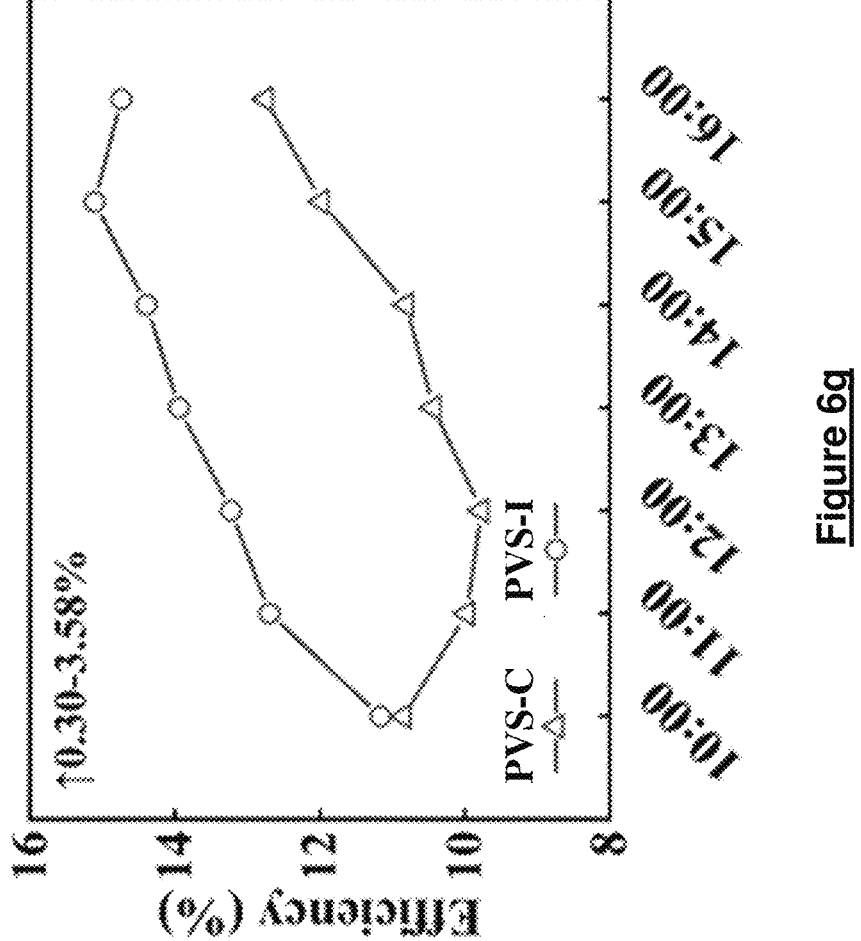
FIG. 6g shows the respective power conversion efficiency of the PVS-I and the PVS-C at the Experiment Site on Day #2.

Because the day-time irradiance on Day #2 was slightly higher than that on Day #1, the electrical performance of both modules of the PVS-I 602a and the PVS-C 602b in Day #02 was slightly better than that in Day #1, but the overall trend is consistent. FIG. 6e shows the P-V curves at four selected moments in Day #2. Similarly, it was found that the improved MPP comes from enhanced $V_{OC}$, while $I_{SC}$ is unaffected by cooling. As indicated in FIG. 6f, power output was significantly enhanced in the PVS-I 602a after the interfacial cooling was fully developed. As indicated, the PVS-I 602a can significantly improve the power output, especially during high-irradiance periods. For example, the power output increased by 7.42 W from 12:00 to 13:00. The daily power generation was increased by 27.67%. As shown in FIG. 6g, the respective efficiency of the PVS-C 602b and PVS-I 602a was 9.77-12.75% and 11.16-15.10%. This means that the PVS-I 602a offers an absolute improvement of 0.3-3.58% over the PVS-C 602b.

On top of the high cooling performance, reliability is essential in real-world PV thermal management applications. To systematically evaluate the reliability of the PVS-I according to the present invention, a continuous side-by-side comparison was conducted using the same experiment setup. This 8-day period (18 Oct. 2023 to 25 Oct. 2023) ("Testing Period") (each day from 09:00 to 17:00) includes rainy, overcast, cloudy, and sunny conditions.

Figure 7A:
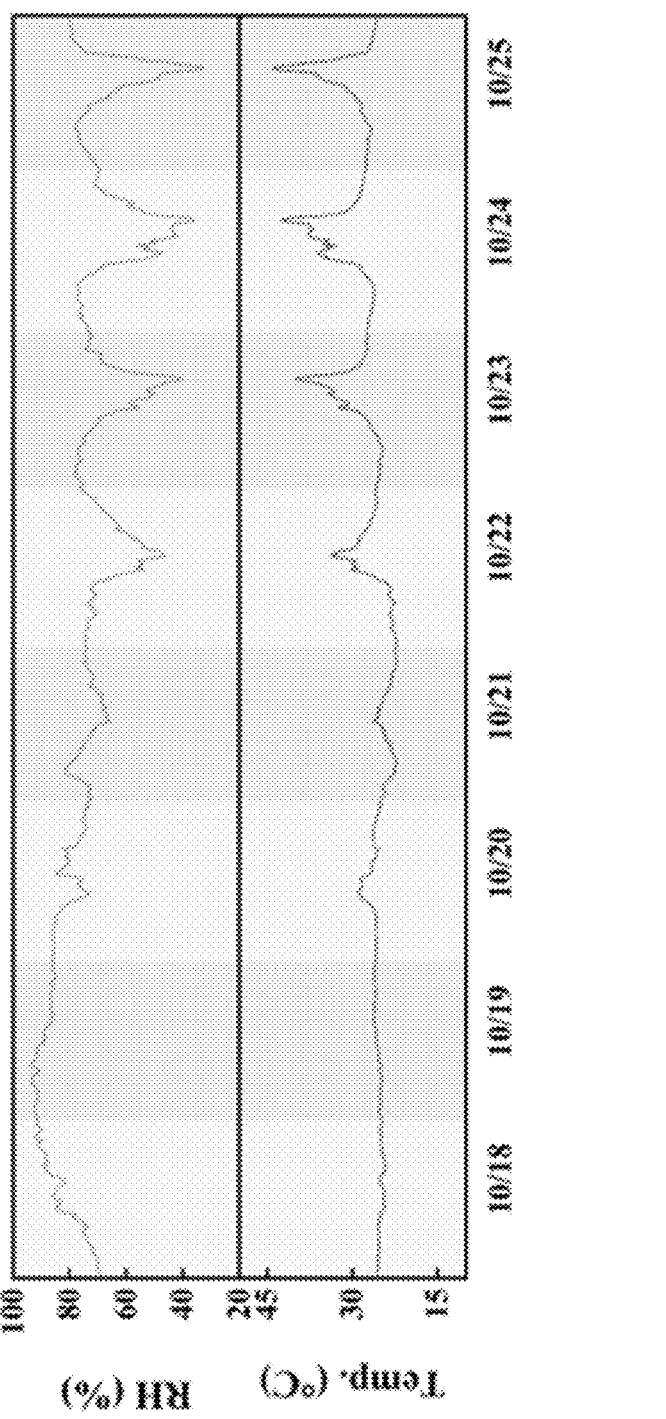
FIG. 7a shows the relative humidity of the Experiment Site during a testing period from 18 Oct. 2023 to 25 Oct. 2023 ("Testing Period")
Figure 7B:
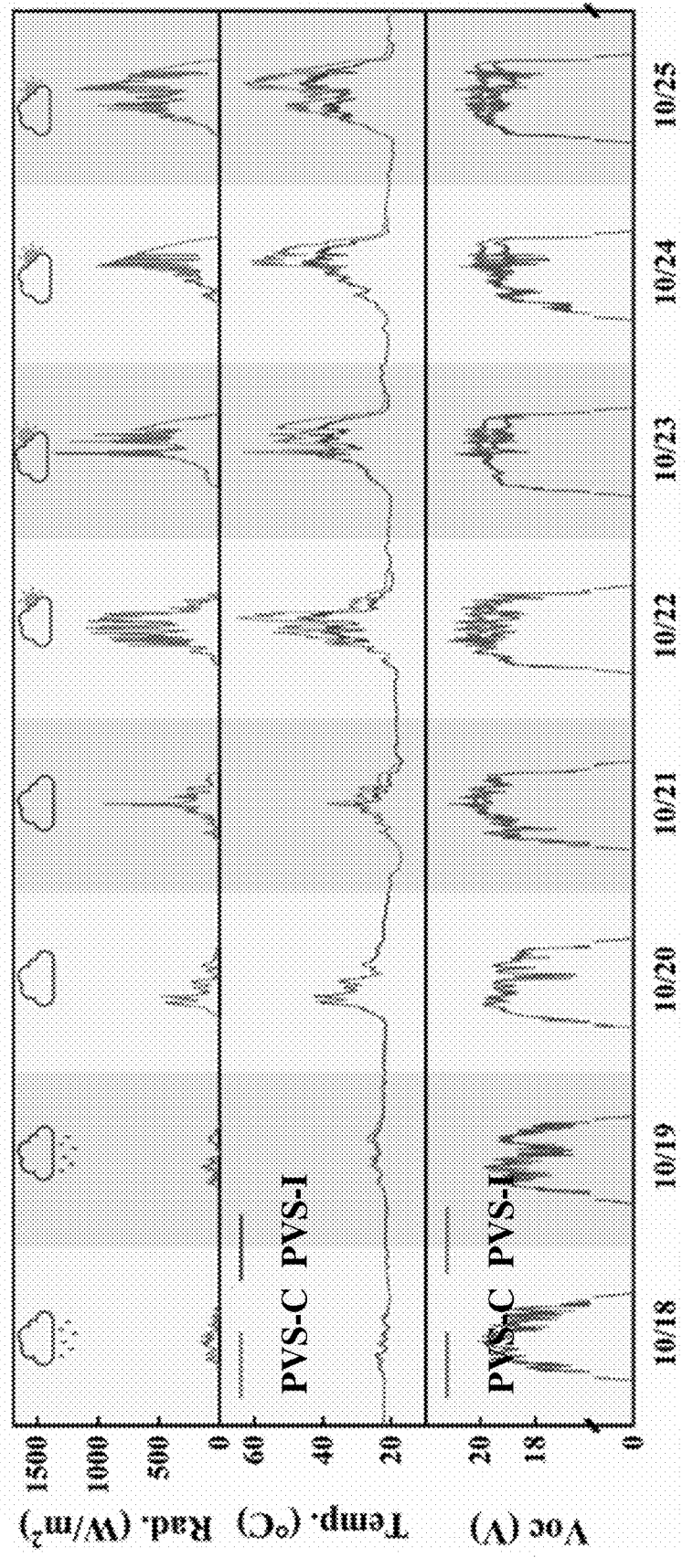
FIG. 7b shows the time evolution of solar irradiance, panel temperatures and open-circuit voltage ($V_{OC}$) of the PVS-I and the PVS-C during the Testing Period.

As indicated in FIG. 7a, the Testing Period witnessed a complicated and volatile solar irradiance due to the complex weather conditions. FIG. 7a shows the relative humidity and air temperature at the Experiment Site during the Testing Period. Their temporal dynamic patterns of the air temperature and relative humidity were broadly in line with the irradiance changes. The middle panel of FIG. 7b shows the temperature variations of the PVS-I 602a and the PVS-C 602b. As indicated, the PVS-I 602a accurately identified whether the PV system needed thermal management and strongly suppressed the rising temperature trend when necessary. During the time period with intensive radiation (irradiance>600 W/m²), the PVS-I 602a could generate a temperature reduction of 8.2-18.8° C. Temperature reductions were always prompt and unaffected by continuous rainy weather or fast-changing irradiance. The bottom panel of FIG. 7b shows the open-circuit voltage ($V_{OC}$) variation during the Testing Period. During the time period without cooling, the PV modules of both the PVS-I 602a and PVS-C 602b show the same trend. However, the PVS-I 602a exhibited a higher $V_{OC}$ than the PVS-C 602b once the cooling system of the PVS-I 602a worked. During the period with intensive solar irradiance (irradiance>600 W/m²), the PVS-I 602a improved the $V_{OC}$ by 0.76-1.47 V.

Figure 7C:
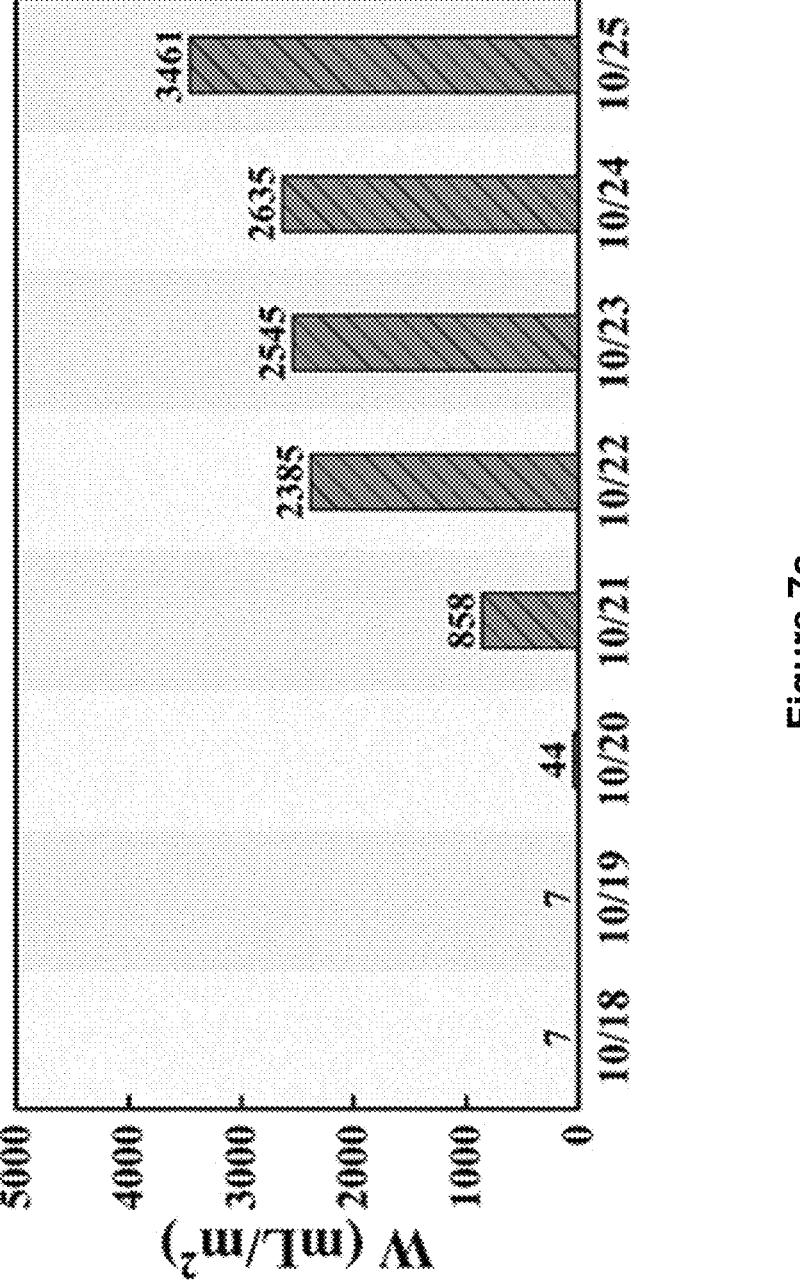
FIG. 7c shows the daily water consumption per unit PV module area of a PVS-I during the Testing Period.
Figure 7D:
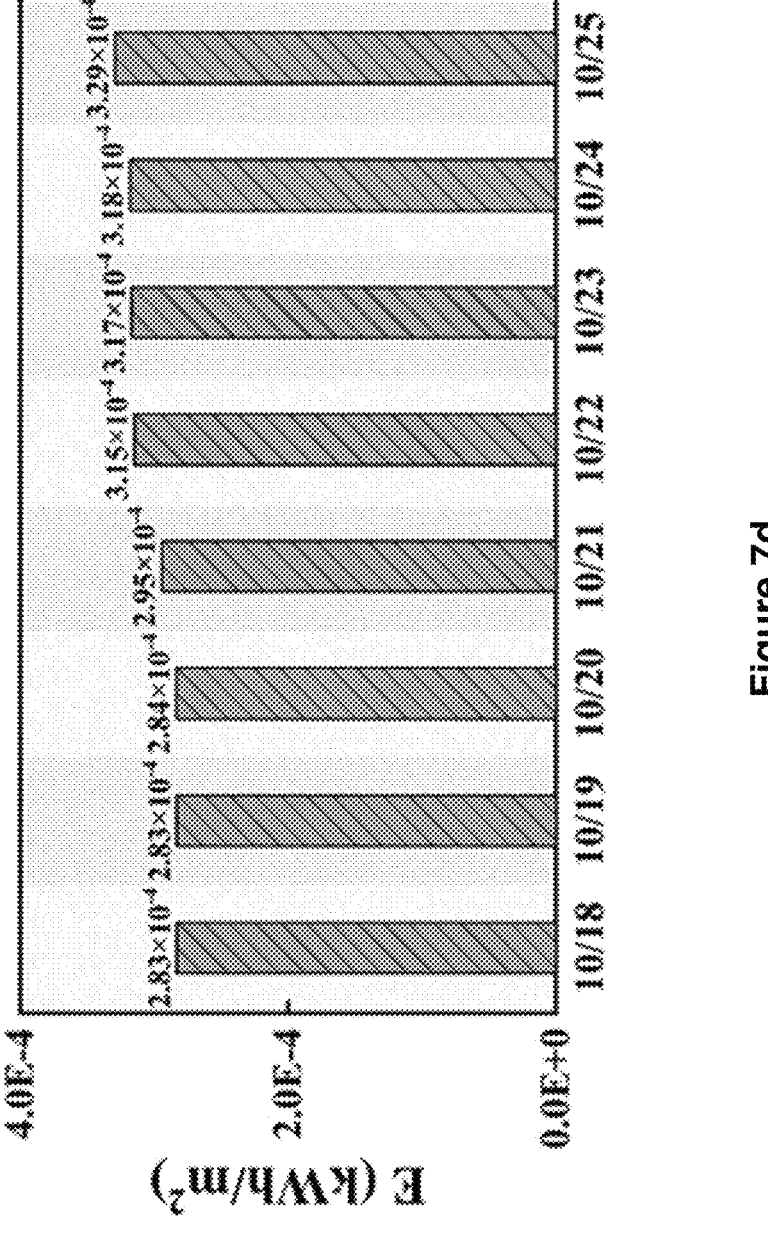
FIG. 7d shows the daily power consumption by controller and water pump per unit PV module area of a PVS-I during the Testing Period.

FIG. 7c shows the daily water consumption per unit PV module area of the PVS-I 602a. As there was no thermal management load in the first three days of the Testing Period, the daily water consumption mainly came from the evaporation to the environment and measurement error. In the following days, the water consumption varied from 858-3,461 mL/m², depending on the weather conditions. The maximum hourly water consumption was 433 mL/ (m²·h). FIG. 7d shows the daily power consumption per unit PV module area of the PVS-I 602a. As shown, the daily power consumption was within 3.5×10−4 kWh. Due to the low water consumption, the pump just needed to work for a few seconds to meet several hours of cooling. Thus, there was no significant difference of daily power consumption across these days. Such a low power consumption also means that the PVS-I 602a will not consume more than 1 kWh of power even in a year. Generally, the above long-term experiment results under various weather conditions indicate that the PVS-I 602a can regulate PV temperatures to the efficient range.

It should be understood that the above only illustrates examples whereby the present invention may be carried out, and that various modifications and/or alterations may be made thereto without departing from the spirit of the invention.

It should also be understood that certain features of the invention, which are, for clarity, described in the context of separate embodiments, may be provided in combination in a single embodiment. Conversely, various features of the invention which are, for brevity, described in the context of a single embodiment, may also be provided separately or in any appropriate sub-combinations.

The invention claimed is:

1. A photovoltaics (PV) panel including:
a PV module with a front face for exposure to sunlight and absorbing solar energy for conversion to electric energy and a back face opposite to said front face, and
an evaporator engaged with said back face of said PV module,
wherein a first end of said evaporator is adapted to be in close proximity to or in contact with a source of a cooling medium for absorbing said cooling medium by capillary action,
wherein said evaporator is of a structure allowing said cooling medium to move through,
wherein said PV module is adapted to be in a heat-transferrable relationship with said cooling medium moving through said evaporator,
wherein said evaporator is of a porous structure allowing said cooling medium absorbed by said evaporator to move from said first end of said evaporator to an opposite second end of said evaporator and to exit said evaporator from said second end,
wherein said evaporator is configured to permit at least a portion of said cooling medium to evaporate to an environment as said cooling medium is absorbed by said evaporator, and
wherein said environment is outside of said photovoltaics PV panel.

2. The PV panel of claim 1, wherein said evaporator is made at least of a cooling medium absorbent material.

3. The PV panel of claim 2, wherein said evaporator is engaged with said back face of said PV module via a thermally-conductive layer.

4. The PV panel of claim 3, wherein said thermally-conductive layer is made at least of an adhesive thermally-conductive material.

5. The PV panel of claim 1, wherein said second end of said evaporator is adapted to be in close proximity to or in contact with a lower container for collecting said cooling medium exiting said evaporator from said second end.

6. A photovoltaics (PV) system including a PV panel according to claim 1.

7. The PV system of claim 6,
wherein said PV module is inclined relative to the horizontal, and
wherein said evaporator is of a porous structure allowing at least a portion of said cooling medium absorbed by said evaporator to move under gravity from said first end to an opposite second end which is lower than said first end to exit said evaporator.

8. The PV system of claim 6, wherein said evaporator is engaged with said back face of said PV module via a thermally-conductive layer.

9. The PV system of claim 8, wherein said thermally-conductive layer is made at least of an adhesive thermally-conductive material.

10. A photovoltaics (PV) system including a PV panel including:

a PV module with a front face for exposure to sunlight and absorbing solar energy for conversion to electric energy and a back face opposite to said front face, and an evaporator engaged with said back face of said PV module, wherein a first end of said evaporator is adapted to be in close proximity to or in contact with a source of a cooling medium for absorbing said cooling medium by capillary action, wherein said evaporator is of a structure allowing said cooling medium to move through, and wherein said PV module is adapted to be in a heat-transferrable relationship with said cooling medium moving through said evaporator, said PV system further including:

a pump operable to pump said cooling medium to an upper container to be absorbed by said evaporator, an irradiance sensor, a liquid-level sensor, and a control system, wherein said control system is adapted to:

stop operation of said pump when solar irradiance on said PV panel as measured by said irradiance sensor is below a threshold level, activate operation of said pump for a first predetermined period of time to pump said cooling medium to said upper container when solar irradiance on said PV panel as measured by said irradiance sensor is above said threshold level, and activate operation of said pump for a second predetermined period of time to pump said cooling medium to said upper container when solar irradiance on said PV panel as measured by said irradiance sensor is above said threshold level and said cooling medium in said upper container as sensed by said liquid-level sensor is below a pre-set level.

11. The PV system of claim 7, further including a path allowing said cooling medium exiting said evaporator from said second end of said evaporator to move to a pump.

12. The PV system of claim 11, wherein said second end of said evaporator is in close proximity to or in contact with a lower container for collecting said cooling medium exiting said evaporator from said second end.

13. An evaporating system for a photovoltaics (PV) system, including:

an evaporator engageable with a back face of a PV module, and an upper container for a cooling medium, wherein a first end of said evaporator extends in close proximity to or at least partly into said upper container and is adapted to absorb said cooling medium in said upper container by capillary action, wherein said evaporator is of a structure allowing said cooling medium to move through, wherein, when said evaporator is engaged with said PV panel, said PV module is adapted to be in a heat-transferrable relationship with said cooling medium moving through said evaporator, and wherein said evaporator includes a face facing away from said front face of said PV module allowing at least a portion of said cooling medium absorbed by said evaporator to evaporate to an environment outside of said PV system.

14. The evaporating system of claim 13, wherein said evaporator is made at least of a cooling medium absorbent material.

15. The evaporating system of claim 13, wherein said evaporator is of a porous structure allowing at least a portion of said cooling medium absorbed by said evaporator to move under gravity from said first end to an opposite second end which is lower than said first end to exit said evaporator.

16. The evaporator system of claim 15, wherein said second end of said evaporator is in close proximity to or in contact with a lower container for collecting said cooling medium exiting said evaporator from said second end.

17. The evaporating system of claim 13, wherein said evaporator is engageable with said back face of said PV module via a thermally-conductive layer.

18. The evaporating system of claim 17, wherein said thermally-conductive layer is made at least of an adhesive thermally-conductive material.

19. The evaporating system of claim 13, further including a pump operable to pump said cooling medium to said upper container to be absorbed by said cooling member.

20. An evaporating system for a photovoltaics (PV) system, including:

an evaporator engageable with a back face of a PV module, and an upper container for a cooling medium, wherein a first end of said evaporator extends in close proximity to or at least partly into said upper container and is adapted to absorb said cooling medium in said upper container by capillary action, wherein said evaporator is of a structure allowing said cooling medium to move through, and wherein, when said evaporator is engaged with said PV panel, said PV module is adapted to be in a heat-transferrable relationship with said cooling medium moving through said evaporator, said evaporating system further including:

a pump operable to pump said cooling medium to said upper container to be absorbed by said cooling member, an irradiance sensor, a liquid-level sensor, and a control system wherein said control system is adapted to:

stop operation of said pump when solar irradiance on said PV panel as measured by said irradiance sensor is below a threshold level, activate operation of said pump for a first predetermined period of time to pump said cooling medium to said upper container when solar irradiance on said PV panel as measured by said irradiance sensor is above said threshold level, and activate operation of said pump for a second predetermined period of time to pump said cooling medium to said upper container when solar irradiance on said PV panel as measured by said irradiance sensor is above said threshold level and said cooling medium in said upper container as sensed by said liquid-level sensor is below a pre-set level.

21. The evaporating system of claim 16, further including a path allowing said cooling medium exiting said evaporator from said second end of said evaporator to be returned to a pump.

\* \* \* \* \*